United States Patent [19]
Yasrebi et al.

[11] Patent Number: 5,624,604
[45] Date of Patent: Apr. 29, 1997

[54] METHOD FOR STABILIZING CERAMIC SUSPENSIONS

[76] Inventors: Mehrdad Yasrebi, 9750 SE. Talbert, Clackamas, Oreg. 97015; William W. Kemp, 4216 SE. Adams, Milwaukie, Oreg. 97222; David H. Sturgis, 17575 SE. Braden Ct., Gladstone, Oreg. 97027; Ilhan A. Aksay, 16 Kimberly Ct., Princeton, N.J. 08540; Hamazo Nakagawa, #402 Nishi-onda Apartment, 7-52, Kamihara-cho 2-chome, Ube City, Yamaguchi 755, Japan

[21] Appl. No.: 239,706

[22] Filed: May 9, 1994

[51] Int. Cl.$^6$ .............................. B01J 13/00; C04B 35/04; C04B 35/505; C09C 3/08
[52] U.S. Cl. .................. 252/313.1; 106/461; 252/314; 252/315.2; 428/402.24; 501/108; 501/136; 501/137; 501/138; 501/152
[58] Field of Search .................. 252/313.1, 363.5, 252/315.2, 314; 106/38.27, 38.9, 461; 501/136, 137, 138, 152, 108; 505/165

[56] References Cited

U.S. PATENT DOCUMENTS

| | | | |
|---|---|---|---|
| 4,385,656 | 5/1983 | Takahashi et al. | 106/38.27 X |
| 5,328,718 | 7/1994 | Abe et al. | 501/137 X |
| 5,348,918 | 9/1994 | Budd et al. | 501/152 X |

OTHER PUBLICATIONS

"Stabilization of Alumina Dispersions with Carboxylic Acids," *Proceedings of the Second European Ceramic Society Conference (ECerS '91)*, 1991, Augsburg, Graule, et al., 7 pp.

"Stability of Aqueous $\alpha$–$Al_2O_3$ Suspensions with Poly-(methacrylic acid) Polyelectrolyte," *J. Am. Ceram. Soc.*, 71[4](1988), pp. 250–255, Cesarano III, et al.

"Interactions of Metal Hydrous Oxides with Chelating Agents," *Journal of Colloid and Interface Science*, vol. 134, No. 2, Feb. 1990, Torres, et al.

Primary Examiner—Richard D. Lovering
Attorney, Agent, or Firm—Klarquist Sparkman Campbell Leigh & Whinston

[57] ABSTRACT

A method for dispersing and reducing the rate of dissolution and/or hydration of colloidal ceramic suspensions is described. The method comprises adding to a ceramic suspension a non-polymeric hydroxylated organic compound. The organic compound has at least one hydroxyl group, preferably at least two hydroxyl groups. The organic compound also includes a functional group selected from the group consisting of a carboxyl, a carboxylate, a sulfonic acid, a sulfonate, a phosphoric acid, a phosphate, an amine, and a quaternary ammonium salt. The ceramic suspension typically comprises a colloidal suspension of a metal oxide, wherein the metal of the metal oxide is an alkali metal, alkaline-earth metal or a rare-earth metal, but preferably is magnesium, calcium or a rare-earth metal. The non-polymeric organic compound is added to the suspension in an amount effective to substantially disperse and reduce the rate of dissolution of the ceramic particles, such as from about 0.01 weight percent to about 5.0 weight percent.

50 Claims, 7 Drawing Sheets

METHOD FOR STABILIZING CERAMIC SUSPENSIONS

FIELD OF THE INVENTION

This invention concerns hydroxylated non-polymeric organic compounds that disperse ceramic particles in aqueous suspensions and simultaneously reduce ceramic particle dissolution and hydration.

BACKGROUND OF THE INVENTION

Aqueous suspensions of ceramic particles, such as magnesium, calcium and yttrium oxide, are used industrially to form ceramic articles. A suspension is a system in which small particles, typically solid particles, are uniformly dispersed in a liquid, such as water. Particles on the order of less than about 5 μm may be classified as colloidal particles, and a suspension of such particles is referred to as a colloidal suspension. Ceramic suspensions are used to make ceramic objects. A ceramic is a hard, brittle, heat- and corrosion-resistant material that may be produced by forming the ceramic particles into a desired shape and then firing the shape to its final density. Ceramic suspensions used to make ceramics typically include more than one type of particle, and also may include binders and surfactants.

Ceramics normally are at least partially soluble in water. Furthermore, ceramics may hydrate, that is the ceramics may react with water to form a bond. The compounds that result from the hydration are referred to as hydrates. To what extent and how quickly ceramics dissolve (the dissolution rate) or hydrate varies. Moreover, colloidal particles of ceramics may agglomerate in water. The extent to which ceramics dissolve, hydrate or agglomerate in water depends on many factors, including the nature of the ceramic, the oxidation state of the ceramic, the pH of the system and temperature. Unagglomerated colloidal suspensions are useful for many ceramic applications. Persons skilled in the art of ceramic processing have long sought methods to stabilize colloidal suspensions, i.e., preventing the suspensions from agglomerating, while simultaneously reducing the dissolution and hydration rates.

Aqueous colloidal suspensions can be dispersed, and such dispersion may proceed by a number of mechanisms. For instance, three known mechanisms include electrostatic, steric, and electrosteric mechanisms. These mechanisms are reviewed by Cesarano and Aksay, "Stability of Aqueous α-Al$_2$O$_3$ Suspensions with Poly(methacrylic acid) Polyelectrolyte," *J. Am. Ceram. Soc.*, 71:250–255 (1988). Electrostatic stabilization involves creating like charges on the surface of colloidal particles so that such particles repel each other, thereby dispersing the suspension of such particles. Id. Steric stabilization involves adsorbing relatively-large polymeric compounds onto the surface of particles. Parts of the polymer become strongly attached to the surface of particle, whereas the rest of the polymer may trail freely in the aqueous medium. If the aqueous medium is a good solvent for the polymer, interpenetration of polymer chains, i.e., the interaction of polymers on separate particles, is not energetically favorable. As a result, individual particles repel each other (interparticle repulsion), thereby dispersing the suspension. Id.

Finally, electrosteric stabilization is a combination of electrostatic and steric stabilization. Electrosteric stabilization involves adsorbing charged polymers (polyelectrolytes) on the surface of colloidal particles. The surface of a ceramic particle normally is composed of negative as well as positive sites. For instance, such sites might include functional groups such as $^-$OH, H$^+$, O$^{2-}$, O$^-$, etc. The relative concentration of each charge depends on a number of factors such as the nature of metal, the oxidation state of the metal, and the pH of the system. Polyelectrolytes have associated with them an overall electrical character (i.e., positive or negative). Polyelectrolytes adsorb strongly to the surface of particles by attaching themselves to oppositely charged sites on the surface of particles. However, not all the ionic sites on each polyelectrolyte are used during the adsorption process. Some of the ionic sites will be used to adsorb the polyelectrolyte to the surface of the ceramic particle, whereas some of the ionic sites will be in the part of the polymer that trails freely in the aqueous medium. The combined like charges associated with the particle surface and polymer chains in solution give each particle an overall negative or positive charge for the particle-polymer composition. Each "polymer-coated" particle will repel the like charges associated with a second "polymer-coated" particle because such particles experience an electronic repulsion. This electronic repulsion, in combination with the steric effect of the polymer, disperses the suspension. Id.

Organic polymers may also be used as particle growth inhibitors during solution precipitation methods of particle formation. Formation of unagglomerated particles with controlled size is highly desirable. As solid particles nucleate from ions in solution, uncontrolled growth and agglomeration may occur. If initial precipitating salt solutions contain dispersing polymers, available dispersing agents in solution adsorb on the surface of growing particles and inhibit their further growth and agglomeration.

Suitable organic polymers that may be used for stabilizing ceramics typically have "anchoring sites." Anchoring sites are chemical functional groups, particularly groups that ionize in aqueous suspensions or solutions. The anchoring sites are attracted to the particle. Polymeric compounds having many types of anchoring sites are suitable for adsorption onto ceramic surfaces. Such functional groups include, for example, a carboxyl (–COOH), a sulphonic acid (–SO$_3$H) and a phosphoric acid (PO$_3$H). These functional groups are suitable for adsorption into positive sites associated with the ceramic surface. Amines (R$_2$NH) and quaternary ammonium salts (R$_4$N$^+$) are examples of functional groups suitable for adsorption into negative sites associated with ceramic surfaces.

Besides colloidal dispersion, reducing the attack by water (i.e., hydration and/or solvation) on the ceramic particle also is an important consideration for making commercially suitable ceramic slurries. Ceramic materials normally react with water and either partially dissolve (referred to as dissolution or solvation) or form hydrates. The extent of dissolution or hydration varies among different ceramic materials. As ceramic materials dissolve, the dissolved species may substantially change the ionic strength of the solution and consequently agglomerate the particles. Furthermore, if the charge of the species that dissolves is different from the charge of the ceramic particles or other components of the slurry (e.g., the ceramic particles have negative charge, but the dissolving species have positive charge or vice versa), then the dissolving species may preferentially adsorb onto different components of the slurry. This may change the rheological (the deformation and flow of matter) properties of the slurry, as well as other properties of interest in the slurry. Finally, as ceramic materials react with water, some ions may preferentially dissolve and consequently change the ratio of ions in each particle. This may result in changes in the physical or chemical properties of the ceramic.

In the case of particle hydration, some ceramics form an hydroxide surface layer. However, attack by water also may proceed farther than the surface layer and may advance into the body of the particle. As a result, size, morphology, and the crystal phase of the particles may change. In many commercially important ceramics, such as alumina ($Al_2O_3$), zirconia ($ZrO_2$), and zircon ($ZrSO_4$), to name a few, the dissolution rate and the extent to which dissolution proceeds is low enough so that it does not seem to interfere with their aqueous commercial use, at least under mild acidic or basic conditions, such as from about pH 3 to about pH 11. Furthermore, hydration does not seem to form more than a thin surface layer, at least when the particle size is equal to or larger than one micrometer.

However, other commercially important ceramics, such as magnesia (MgO), calcia (CaO) and yttria ($Y_2O_3$), to name a few, dissolve in an aqueous media to a much larger extent and at faster rates than the ceramic materials discussed above. In some other commercially important ceramics, such as high $T_c$ superconductors or perovskites, one cation may preferentially dissolve in water and alter the cationic ratio of the initial powder. Perovskite typically is a natural or synthetic crystalline mineral composed of certain oxide compounds, particularly titanates. Examples of Perovskites, without limitation, include lead titanate ($PbTiO_3$), barium titanate ($BaTiO_3$) and strontium titanate ($SrTiO_3$). As a result, aqueous processing of these material, such as magnesia, calcia, yttria, perovskites, and high $T_c$ superconductors, is either difficult or impractical under most conditions. Furthermore, MgO, CaO, and aluminum nitrides (AlN), to name a few, are known to be attacked by water and hydrate extensively, such as deeper than just a surface layer.

Many attempts have been made by persons skilled in the art of ceramic processing to reduce the dissolution and hydration of ceramic particles, while simultaneously keeping the ceramic particles dispersed (unagglomerated) in suspensions. Of the three methods for stabilizing colloidal suspensions mentioned earlier, electrostatic is the least favorable method for reducing water attack. Electrostatic stabilization is normally achieved by adjusting the pH of the suspension to a pH suitable to produce a particle surface charge that is high enough to induce dispersion. When this method of colloidal stabilization is utilized, the particle surface is in direct contact with the aqueous environment. As a result, the aqueous medium attacks the surface of the ceramic particle, and the particles either dissolve or hydrate.

In limited cases, however, water attack can be reduced by electrostatic stabilization. For example, Horton's U.S. Pat. No. 4,947,927 teaches that by adjusting the pH of a yttria slurry to high pH values in excess of pH 11 one can make yttria intrinsically less soluble in water, thereby decreasing its sensitivity to water attack. This approach, however, has great limitations and is not generally applicable to other materials.

Compared to electrostatic stabilization, electrosteric stabilization apparently provides a better method for simultaneously dispersing colloidal particles in suspension and reducing water attack on the ceramic surface. As polyelectrolytes strongly adsorb onto a ceramic surface, the polyelectrolyte provides a barrier layer between water molecules and the ceramic surface, thereby reducing the effect of water on the ceramic particle. This method initially provides a shield against water attack. However, it has been shown that if the dissolving ions have opposite charges compared to the anchoring sites of the polyelectrolyte, as the ions dissolve into solution, they bond with oppositely charged anchoring sites on the polyelectrolytes (anchoring sites which are not adsorbed on the surface), thereby either (1) precipitating the polyelectrolyte out of solution, or (2) forming a bridge between different particles and causing them to agglomerate. H. Nakagawa, M. Yasrebi, J. Liu, and I. A. Aksay, "Stability and Aging of Aqueous MgO Suspensions," presented at the annual meeting of the Am. Ceram. Soc. (1989) The limitations of polymethacrylic acid and the stabilization of MgO are demonstrated below in Example 2.

Steric stabilization is an even more attractive method for protecting ceramic surfaces from water attack compared to electrostatic or electrosteric stabilization. Stabilizing polymers, which do not include charged sites in their unabsorbed tails and loops, provide a barrier between the surface and the water molecules; hence, stabilizing polymers do not interact with dissolving species as in the case of polyelectrolytes.

Although the above discussion is generally true, steric stabilization also has its own practical limitations. For instance, as the ratio between the number of hydroxyl groups relative to acrylic-acid groups increases for an acrylic acid-vinyl alcohol copolymer, the copolymer becomes a more effective barrier for protecting MgO from attack by water in aqueous environment. See JP 81 73 623, and JP 81 73 624. However, as this ratio increases, the polymer loses its effectiveness as a shield between the surface of the particle and the water molecules. Although no explanation is offered in the above patents for this observed behavior, apparently as the ratio between the number of hydroxyl and acrylic acid groups increases, the affinity of the polymer for the ceramic surface is reduced to a point where no substantial surface adsorption occurs. Thereafter, the copolymer becomes ineffective.

Another common method for protecting ceramic particles from attack by water has been to coat the particles with a thin layer of hydrophobic material. Common materials for this purpose include different waxes. Although this method keeps water away from the particle surface, the particles become more hydrophobic as the amount of hydrophobic material used to coat the particle increases. As the hydrophobic nature of the particles increase, the particles agglomerate, and thus must be redispersed in water by adding dispersing agents such as surfactants. The need for additional dispersing agents makes this method less practical. More importantly, due to either insufficient uniformity of wax coating, or rapid removal of wax from the surface, this method has not proven to be effective.

Still other methods of reducing water attack have been used. Surface coating or fusion of particles with an inorganic material that is more inert to water attack has proven somewhat effective in reducing the water sensitivity of some ceramics. However, the foreign inorganic material is incorporated into the ceramic end product, which is unacceptable in most situations.

Recently, monomers have been used to prevent the agglomeration of alumina suspensions. Graule et al., "Stabilization of Alumina Dispersions with Carboxylic Acids," *Proceedings of the Second European Ceramic Society Conference* (1991). Graule discusses the ability of certain carboxylic acids to stabilize high-purity alumina suspensions in aqueous media. More specifically, Graule studied dispersing $\alpha$-$Al_2O_3$ powder using L-lactic acid, DL-malic acid, tartaric acid, tricarballylic acid, citric acid, 2-hydroxybenzoic acid, 3-hydroxybenzoic acid, and 4-hydroxybenzoic acid. Graule teaches that the efficiency of hydroxy carboxylic acids to act as dispersion agents for $\alpha$-$Al_2O_3$ increases over the series from lactic, malic, tartaric, tricarballylic to citric acid.

Moreover, the efficiency of hydroxybenzoic acids increases from 4- to 3- to 2-hydroxybenzoic acid.

More recently, T. Ren, I. A. Aksay, M. Yasrebi, N. B. Pellerin, and J. T. Staley, have investigated Graule's work in more detail. T. Ren et al., "Hydroxylated Carboxylic Acid Monomers Serve as Dispersants for Ceramic Particles," (unpublished works). T. Ren et al. used twenty-one carboxylic acids to evaluate the ability of carboxylic acid. The acids tested had from one to four carboxyl ($-CO_2H$) and/or carboxylate groups ($CO_2^-$), depending on the pH of the suspension. Table I below shows the formulas of the acids tested.

The dispersion tests with the acids shown in Table I have shown that some of the carboxylic acids are better dispersants for colloidal suspensions of alumina. In summary, in confirmation of Graule's work, T. Ren et al. have observed that hydroxyl groups enhance the ability of the monomer to disperse the colloidal metal-oxide particles. Moreover, they have concluded that for compounds that contain the same number of carboxyl groups and which have a similar structure, it appears that as the number of hydroxyl groups increases, the better the carboxylic acid functions as a dispersant.

TABLE I

Carboxylic Acids Investigated in Ren et al.'s Study With Their Molecular Components

| Name | Structure |
| --- | --- |
| A. Mono-carboxylic acids | |
| 1. Glutamic | $-OOCCH(NH_3^+)(CH_2)_2COOH$ |
| 2. Mannuronic | $HOOC[CH(OH)]_4CHO$ |
| B. Di-carboxylic acids | |
| 1. Adipic | $HOOC(CH_2)_4COOH$ |
| 2. Mucic | $HOOC[CH(OH)]_4COOH$ |
| 3. Fumaric (trans) | $HOOCCH=CHCOOH$ |
| 4. meso-Tartaric | $HOOCCH(OH)CH(OH)COOH$ |
| 5. Succinic | $HOOC(CH_2)_2COOH$ |
| 6. Maleic (cis) | $HOOCCH=CHCOOH$ |
| 7. Malic | $HOOCCH_2CH(OH)COOH$ |
| 8. d,l-Tartaric | $HOOC[CH(OH)]_2COOH$ |
| 9. Malonic | $HOOCCH_2COOH$ |
| 10. Tartronic | $HOOCCH(OH)COOH$ |
| 11. Mesoxalic | $HOOCCOCOOH$ |
| 12. Glutaric | $HOOC(CH_2)_3COOH$ |
| 13. Sebacic | $HOOC(CH_2)_8COOH$ |
| C. Tri-carboxylic acids | |
| 1. Tricarballylic | $HOOCCH_2CH(COOH)CH_2COOH$ |
| 2. Aconitic (trans) | $HOOCCH_2C(COOH)=CHCOOH$ |
| 3. Nitrilotriacetic | $HOOCCH_2N(CH_2COOH)CH_2COOH$ |
| 4. Citric | $HOOCCH_2C(OH)(COOH)CH_2COOH$ |
| D. Tetra-carboxylic acids | |
| 1. Ethylenediamine tetracetate (EDTA) | $HOOCCH_2N(CH_2COOH)CH_2CH_2N(CH_2-COOH)CH_2COOH$ |

Graule and his co-workers speculate that the dispersion efficiency of hydroxy carboxylic acids depends on their ability to form chelate complexes. Furthermore, Ren and his co-workers have shown that apparently the hydroxyl group enhances the adsorption of the acid onto the alumina particles. In support of this possibility, they have found that, in adsorption tests, citric acid and meso-tartaric acid always absorb to a greater extent than do the structurally similar compounds, tricarballylic acid and fumaric acid. Citric acid and meso-tartaric acid have hydroxyl groups, whereas tricarballylic acid and fumaric acid do not. In addition, percent ionic dissociation of all four monomers were measured versus pH and was shown to be very similar. Ren and his co-workers concluded that the presence of a hydroxyl group may aid the adsorption of the acid to the colloidal particle. This increased adsorption also may explain the increased ability of such acids to disperse colloidal suspensions of alumina.

Graule et al. and Ren et al. address only dispersion of alumina suspensions. Their work suggests that certain monomers can be used as effective dispersing agents for alumina suspensions. As discussed above, alumina is a relatively stable metal-oxide in an aqueous environment. The limited reaction of alumina with water does not interfere with its aqueous processing in the pH range normally used for ceramic processes, i.e., about a pH of 3–11. Neither Graule nor Ren were concerned with, and apparently did not consider, the reaction of $\alpha$-$Al_2O_3$ with water.

The dissolution of iron oxide particles in the presence of aqueous solutions of ethylenediaminetetraacetic acid (EDTA), and its related aminocarboxyllic acids, has been studied by E. Matijevic and his co-workers. See, for example, R. Torres, M. A. Blesa, and E. Matijevic "Interaction of Metal Hydrous Oxides with Chelating Agents. XI. Reductive Dissolution of Hematite and Magnetite by Aminocarboxyllic Acids," J. Colloid and Interface Sci., Vol. 134, No. 2 (1990). Matijevic et al. discuss the fact that chelate-forming monomers normally are used to enhance particle dissolution. Matijevic et al. also demonstrated that in some cases the adsorptions of these chelating agents inhibited dissolution, whereas in other cases the chelating agents increased dissolution. In either case, however, Matijevic et al. showed that an interaction occurs between dissolving ions and adsorbed chelating agents. As discussed above, such an interaction eventually results in particle flocculation.

In summary, ceramic aqueous suspensions have a variety of industrial applications. Prior-art methods for stabilizing such suspensions rely primarily on polymeric or electrostatic stabilization. These methods often perform poorly for water-reactive ceramics. Graule's recent work as discussed above shows that hydroxylated carboxyl-group containing monomers may be used to disperse alumina, but such work teaches nothing about addressing the problems of particle dissolution and hydration using monomers. On the other hand, Matijevic et al.'s work on particle dissolution primarily emphasized enhancing the effects monomers have on particle dissolution. Hence, a need still exists for an improved method for stabilizing colloidal ceramic particles, while simultaneously reducing the rate of dissolution and/or hydration of such particles.

SUMMARY OF THE INVENTION

The present invention provides a method for dispersing and reducing the rate of dissolution or hydration of ceramics in aqueous suspensions. The invention also is directed to a composition comprising an aqueous suspension of a reactive, water-soluble ceramic, and about 0.1 weight percent to about 5.0 weight percent of a non-polymeric organic compound, the compound having at least one hydroxyl group, the compound also having a functional group selected from the group consisting of a carboxyl, a carboxylate, a sulfonic acid, a sulfonate, a phosphoric acid, a phosphate, an amine, and a quaternary ammonium salt. By way of example, the organic compound may be selected from the group consisting of a hydroxylated carboxylic acid, a hydroxylated carboxylate, a hydroxylated sulfonic acid, a hydroxylated sulfonate, a hydroxylated phosphoric acid, a hydroxylated phosphate, a hydroxylated amine and a hydroxylated quaternary ammonium salt. More specifically, the non-polymeric organic compound may be selected from the group consisting of a hydroxylated lower-alkyl carboxylic acid, a hydroxylated lower-alkenyl carboxylic acid, a hydroxylated lower-alkynyl carboxylic acid, a hydroxylated aromatic carboxylic acid, and combinations thereof. The ceramic may be selected from the group consisting of metal oxides. The metal of the metal oxide may be selected from the group consisting of Mg, Ca and the rare-earth metals, such as Y. The metal oxide also may be selected from the group consisting of perovskites and high $T_c$ superconductors. A perovskite is a family of natural or synthetic crystalline minerals composed of certain oxide compounds, particularly titanates. Examples of perovskites, without limitation, include lead titanate (PbTiO$_3$), barium titanate (BaTiO$_3$) and strontium titanate (SrTiO$_3$). A particular example of a superconductor, without limitation, is 1,2,3-superconductor.

One specific embodiment of the composition comprises an aqueous colloidal suspension of a reactive metal oxide. The metal of the metal oxide may be selected from the group consisting of Mg, Ca and the rare-earth metals, such as Y. The metal oxide also may be selected from the group consisting of perovskites or high $T_c$ superconductors. The composition also includes an amount of a non-polymeric organic compound effective to disperse the metal oxide and substantially reduce the rate of metal-oxide dissolution and/or hydration. The effective amount, without limitation, typically is from about 0.01 to about 5.0 weight percent, based on the dry weight of the metal oxide. The non-polymeric organic compound may be a carboxylic acid according to the formula

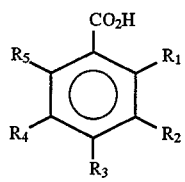

wherein at least one, preferably at least two, of $R_1$–$R_5$ are hydroxyl and the remainder of $R_1$–$R_5$ are independently selected from the group consisting of hydrogen and hydroxyl.

The method of the present invention comprises adding to a ceramic suspension an effective amount of a non-polymeric hydroxylated organic compound. An "effective amount" is an amount effective to substantially disperse the ceramic in suspension, and reduce the rate of dissolution and/or hydration of the ceramic particles. Without limitation, this amount typically is from about 0.01 weight percent to about 5.0 weight percent, preferably from about 0.1 to about 5.0 weight percent, even more preferably from about 0.1 to about 3.0 weight percent, and most preferably from about 0.1 to about 1.0 weight percent, based on the dry weight of the metal oxide. The non-polymeric organic compound has at least one hydroxyl group and a functional group that is selected from the group consisting of a carboxyl, a carboxylate, a sulfonic acid, a sulfonate, a phosphoric acid, a phosphate, an amine, and a quaternary ammonium salt. The ceramic suspension typically, but not necessarily, comprises a colloidal suspension of a metal-oxide, including perovskites, and suspensions of high $T_c$ superconductors. The metal of the metal oxides may be selected from the group consisting of alkali metals, alkaline earth metals and the rare-earth metals, but preferably is magnesium, calcium and the rare earth metals, such as yttrium.

More specifically, the method comprises the steps of first forming an aqueous suspension, particularly colloidal suspensions, of a reactive ceramic. As used herein, "ceramic" may include by way of example only and without limitation, a metal oxide, including perovskite compounds such as lead titanate (PbTiO$_3$), barium titanate (BaTiO$_3$) and strontium titanate (SrTiO$_3$), a metal nitride, a metal carbide, a metal sulfide, a metal boride, and high $T_c$ superconductors, such as 1,2,3-superconductor. The ceramic typically is a reactive metal oxide. The metal of the ceramic typically is selected from the group consisting of alkali metals, alkaline-earth metals, and rare-earth metals. The alkali metals include lithium, sodium, potassium, rubidium, cesium and francium. The alkaline-earth metals include beryllium, magnesium, calcium, strontium, barium, and radium. The rare-earth metals include lanthanum, cerium, praseodymium, samarium, europium, gadolinium, terbium, dysprosium, holmium, erbium, thulium, ytterbium, and lutetium. The metal preferably is selected from the group consisting of calcium, magnesium and the rare earth metals. The metal is even more preferably selected from the group consisting of magnesium, calcium and yttrium. The metal is most preferably selected from the group consisting of calcium and magnesium. From about 0.01 weight percent to about 5.0 weight percent, preferably 0.1 to about 5.0 weight percent, more preferably from about 0.1 to about 3 weight percent, and even more preferably from about 0.1 to about 1 weight percent, based on the dry weight of the ceramic or metal oxide, of a hydroxylated non-polymeric organic compound, such as a hydroxylated carboxylic-acid monomer, then is added to the suspension. The non-polymeric organic compound has at least one anchoring site (ionizable functional group), such as an amine or sulphonic group, preferably a carboxyl or a carboxylate group, and at least one hydroxyl group attached thereto. The non-polymeric organic compound may have a plurality of hydroxyl groups, and preferred compounds have at least two hydroxyl groups.

Certain non-polymeric organic compounds are preferred. Such compounds have only one anchoring site (ionizable functional group) per molecule for anchoring the non-polymeric organic compound to the reactive ceramic. Preferred anchoring sites include a carboxyl group and a carboxylate, which is the ionized form of a carboxyl group. Preferred non-polymeric organic compounds also include at least one hydroxyl group, and even more preferably include at least two hydroxyl groups.

By way of example, the organic compound may be selected from the group consisting of a hydroxylated carboxylic acid, a hydroxylated carboxylate, a hydroxylated sulfonic acid, a hydroxylated sulfonate, a hydroxylated phosphoric acid, a hydroxylated phosphate, a hydroxylated amine and a hydroxylated quaternary ammonium salt. More specifically, the non-polymeric organic compound may be selected from the group consisting of a hydroxylated lower-alkyl carboxylic acid, a hydroxylated lower-alkenyl carboxylic acid, a hydroxylated lower-alkynyl carboxylic acid, a hydroxylated aromatic carboxylic acid, and combinations thereof.

Preferably, the organic compound is selected from the group consisting of a hydroxylated carboxylic acid and a hydroxylated carboxylate, such as the group consisting of hydroxylated benzoic acids. For instance, the organic compound may comprise a hydroxylated carboxylic-acid according to the formula

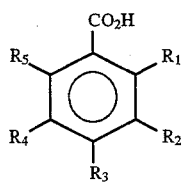

wherein at least one, and preferably at least two, of $R_1-R_5$ are hydroxyl. Without limitation, a suitable non-polymeric compound for the present invention is an organic compound according to the formula wherein at least one of $R_1-R_6$ is a hydroxyl group, at least one of $R_1-R_6$ is selected from the group consisting of a carboxyl and a carboxylate (although at least one of $R_1-R_6$ may be selected from the group consisting of a sulfonic acid, a sulfonate, a phosphoric acid, a phosphate, an amine, and a quaternary ammonium salt), and the remainder of $R_1-R_6$ are selected from the group consisting of hydroxyl and hydrogen. Preferred compounds according to this formula have (1) at least one functional group selected from the group consisting of a carboxyl and a carboxylate, (2) at least two hydroxyl groups, wherein $R_1$ and $R_2$ or $R_3$ preferably are hydroxyl, preferably $R_2$, and the remainder of the R groups are hydrogen or hydroxyl.

The present invention also provides a method for controlling the size of ceramic particles produced by precipitation. The method first comprises forming a solution of a water-soluble ceramic-material precursor including, but not limited to, water-soluble salts. Examples of the water-soluble precursor include, without limitation, halogen metal salts, such as yttrium chloride, barium chloride, titanium chloride, and copper chloride; metal nitrates, such as yttrium nitrate, barium nitrate, titanium nitrate, and copper nitrate; and metal-oxo species such as titanium dioxide. A precipitating agent is then added to the solution to precipitate ceramic particles. The precipitating agent typically is a basic compound. One example, without limitation, of a suitable precipitating agent is ammonia.

The final step of the method comprises adding to the solution, either simultaneously with the addition of the precipitating agent or immediately thereafter, from about 0.1 weight percent to about 5.0 weight percent, based on the dry weight of the ceramic, of a non-polymeric organic compound. The non-polymeric organic compound has at least one hydroxyl group. The compound also has a functional group selected from the group consisting of a carboxyl, a carboxylate, a sulfonic acid, a sulfonate, a phosphoric acid, a phosphate, an amine, and a quaternary ammonium salt. The non-polymeric organic compound typically has a plurality of hydroxyl groups and the functional group is selected from the group consisting of a carboxyl and a carboxylate. The non-polymeric organic compound may be selected from the group consisting of a hydroxylated carboxylic acid, a hydroxylated carboxylate, a hydroxylated sulfonic acid, a hydroxylated sulfonate, a hydroxylated phosphoric acid, a hydroxylated phosphate, a hydroxylated amine and a hydroxylated quaternary ammonium salt. Particularly suitable non-polymeric organic compounds include the group consisting of hydroxylated benzoic acids. The ceramic particles may be selected from the group consisting of metal oxides, and the metal oxides may include high $T_c$ superconductors and perovskites. From about 0.1 weight percent to about 1.0 weight percent, based on the dry weight of the ceramic, of the non-polymeric organic compound usually is added to the solution.

A first object of the invention is to provide a method for stabilizing colloidal, water-soluble ceramic suspensions.

A second object of the present invention is to identify certain hydroxylated non-polymeric organic compounds that can both disperse colloidal ceramics in an aqueous suspension while also reducing the rate of dissolution and/or hydration of water-soluble ceramics.

An advantage of this invention is that certain hydroxylated non-polymeric organic compounds that have spatial arrangements making such acids particularly suitable for stabilizing colloidal suspensions of water-soluble ceramics.

DETAILED DESCRIPTION OF THE PREFERRED EMBODIMENTS

Figure 1:
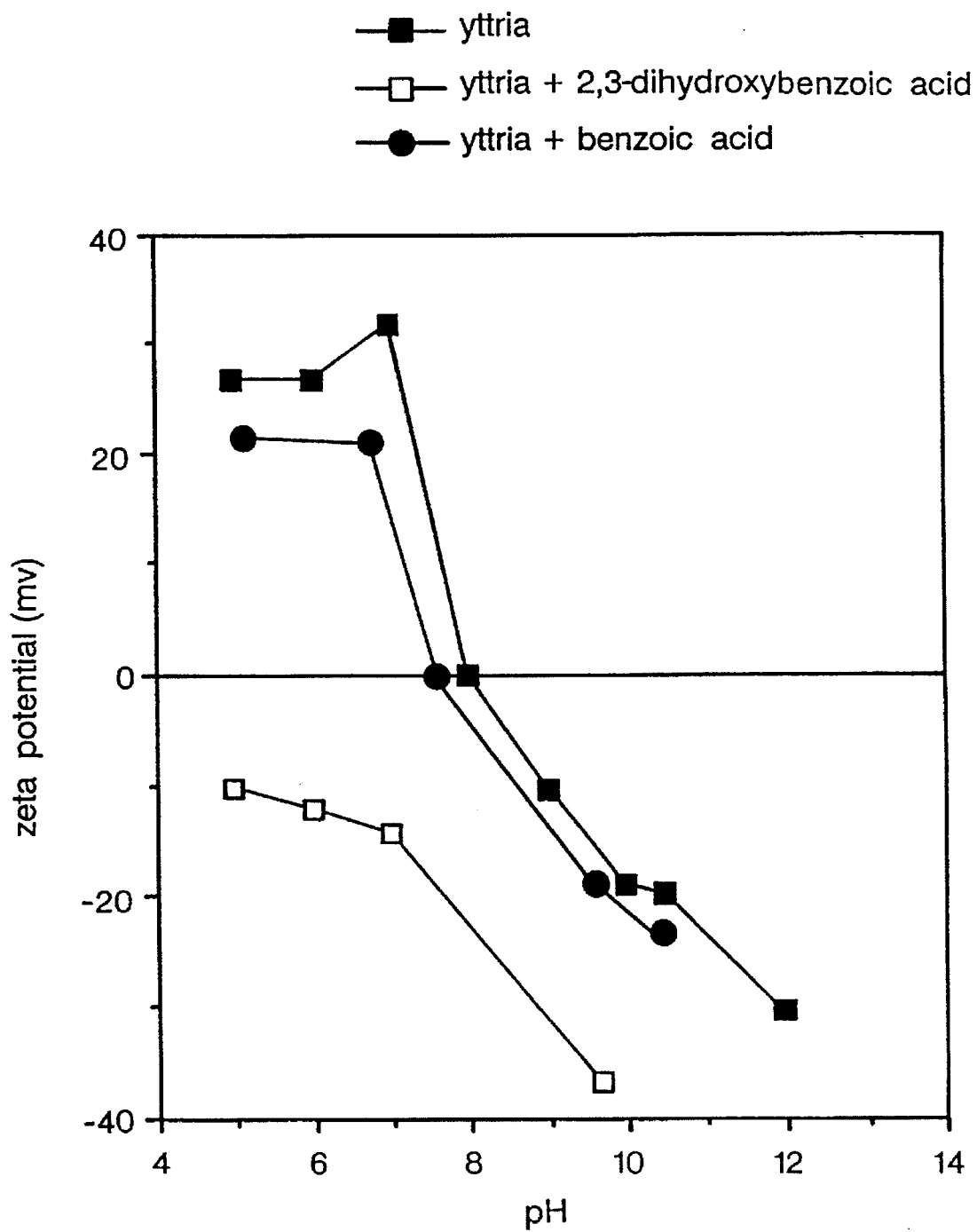
FIG. 1 is a graph of the zeta potential of a yttrium-oxide suspension made with and without added hydroxylated carboxylic acids.

The present invention provides a method for dispersing ceramic particles, and substantially reducing the rate of hydration and/or dissolution of such particles. As used herein, "reducing the rate of hydration" or "reducing the rate of dissolution" refers to reducing the rate of dissolution or hydration of a ceramic as compared to the rate of dissolution or hydration of the same ceramic material at the same pH without having a non-polymeric organic compound of the present invention adsorbed to the surface of the ceramic. The method is particularly suitable for use with ceramic suspensions that are used to form ceramic articles including, for example, magnesium-oxide and yttrium-oxide suspensions. As used herein, "ceramic" may include, by way of example only and without limitation, a metal oxide, including perovskite compounds such as lead titanate ($PbTiO_3$), barium titanate ($BaTiO_3$) and strontium titanate ($SrTiO_3$), a metal nitride, a metal carbide, a metal sulfide, a metal boride, and superconductors such as, without limitation, 1,2,3-superconductor, although the ceramic typically is a reactive metal oxide. The present invention also provides a composition comprising an aqueous, colloidal suspension of a ceramic, such as a rare-earth or alkali-metal oxide, a perovskite or a superconductor, and an effective amount of a hydroxylated non-polymeric organic compound. Specific metal oxides contemplated for this invention, without limitation, include magnesium oxide (MgO), calcium oxide (CaO) and yttrium oxide ($Y_2O_3$). Specific perovskites contemplated for this invention, without limitation, include titanates, such as lead titanate ($PbTiO_3$), barium titanate ($BaTiO_3$) and strontium titanate ($SrTiO_3$).

Certain non-polymeric organic compounds, such as hydroxylated carboxylic-acid monomers, adsorb well into the surface of colloidal ceramic particles. Beside ionic sites that adsorb into the surface, these compounds do not have any additional ionic sites. Therefore, dissolved metal ions, such as magnesium, cannot bond with these monomers and destabilize the suspension. Such compounds, and particularly the carboxylic-acid monomers: (1) prevent or substantially reduce the flocculation of colloidal particles; and (2) substantially reduce the rate of ceramic hydration and dissolution.

I. Dissolution of Ceramics

In colloidal processing, water or an organic solvent may be used to suspend ceramic particles, such as magnesium, calcium or yttrium oxide. These metal oxides dissolve at a considerably faster rate in water than other ceramics, such as alumina, and the rate of dissolution must be reduced to provide an acceptable slurry for industrial ceramic processing. One possible approach would be to use an organic solvent for processing such slurries. For instance, absolute ethyl alcohol could be used to process such metal oxides. However, organic solvents are unattractive for industrial purposes because they are more expensive and are more toxic than water.

A. Hydroxylated Non-polymeric Organic Compounds for Stabilizing Water-Reactive Colloidal Ceramics The ability of certain hydroxylated, non-polymeric organic compounds, such as hydroxylated carboxylic-acid monomers to disperse water-reactive colloidal ceramic particles was investigated. "Water-reactive" as used herein refers to compounds that are dissolved, solvated or hydrated in an aqueous environment. "Water-soluble" as used herein means a compound that is at least partially soluble in water to the extent that aqueous processing of the compound is impractical. The solubility of the ceramics discussed herein may vary greatly, and certainly depends upon the conditions under which solubility is determined. Nevertheless, by way of example only and without limitation, suspensions of water-soluble ceramic particles as discussed herein typically have a working lifetime of less than two days. Not all organic compounds are useful as dispersants. Suitable compounds preferably include hydroxyl (—OH) groups, and hence are referred to as hydroxylated non-polymeric organic compounds. For compounds that contain substantially the same charged functional groups-per-carbon atom and have a similar molecular structure, the more hydroxyl groups the molecule has, the better it performs as a dispersant. Varying the chain lengths of the organic compounds does not appear to significantly alter the ability of such compounds to disperse ceramic particles. However, as the carbon chain increases, the solubility of some acids decreases. Hence, the selection of a preferred organic molecule as dispersant depends on: (1) compounds having one "anchoring site," which typically is an ionizable functional group, such as a carboxyl group; (2) including plural hydroxyl groups; and (3) limiting the number of carbon atoms by considering the aqueous solubility of the compound.

Four carboxylic-acid monomers and one carboxylic-acid polymer were used to evaluate the dispersion capability of hydroxylated carboxylic acids. The acids tested were benzoic acid, 2,3-dihydroxybenzoic acid, citric acid, stearic acid, and poly(methacrylic acid) (PMAA). Table II below shows the formulas of the acids tested.

TABLE II

Carboxylic acids of the Present Invention and Their Molecular Structure

| Name | Structure |
| --- | --- |
| Benzoic Acid | $C_7H_6O_2$ |
| 2,3-dihydroxybenzoic acid | $C_7H_6O_4$ |
| Citric acid | $HOOCCH_2C(OH)(COOH)CH_2COOH$ |
| Stearic acid | $HOOC—(CH_2)_{16}—CH_3$ |
| Poly(methacrylic) acid 15,000 MW | $(—CH_2—C(CH_3)COOH—)_n$ |

The acids shown in Table II were used as dispersing agents for ceramic powders. For purposes of this application, yttria ($Y_2O_3$) and magnesia (MgO), are examples of water-reactive ceramics, and alumina ($Al_2O_3$) is an example of a relatively water-nonreactive ceramic powder. The yttria used in this study was a high purity material (>99.99%, from Rhône-Poulenc, Shelton, Conn.) and had an average particle diameter of about 2 micrometers (µm) and a surface area of about 2.68 $m^2$/g. The magnesia used was a high purity (>99.98%) material obtained from Ube Industries (America), Inc., New York, N.Y. with an average particle diameter of about 0.2 µm and surface area of about 7.7 $m^2$/g. Alumina was obtained from Sumitomo Chem. America, Inc., New York, N.Y. with a purity of better than 99.995%, an average particle diameter of 0.37 (µm), and a surface area of about 6 $m^2$/g.

The suspension generally was prepared as follows: A specific amount of acid was added to deionized water to form a mixture. This mixture was stirred until the acid was completely dissolved (except for stearic acid, which is insoluble in water). The mixture was placed in an ice bath to avoid suspension heat-up during ultrasonication. A two-volume-percent sample of a ceramic powder then was added to the solution using continuous stirring. The pH was adjusted to a desired pH using either reagent grade NaOH or HCl. The suspension was then ultrasonicated for two minutes at 58W using a Fisher Sonic Dismembrator, Model Number 300.

In the case of stearic acid, which is insoluble in water, heptane was substituted for water. A specific amount of stearic acid was added to heptane and mixed until dissolved. A predetermined amount of a sample of a ceramic powder then was poured into the solution and the suspension was ultrasonicated as above. It is known to those skilled in the field of ceramic processing that stearic acid will adsorb onto the surface of ceramic particles using a suspension of stearic acid in heptane as described above. The suspension was then dried at 60° C. in an oven until all the heptane was evaporated. The coated powder was then added to the water to make a 2-volume-percent suspension. This suspension was again ultrasonicated in an ice bath.

Sedimentation and zeta potential tests were performed following the formation of ceramic particle suspensions as described above. Zeta potential tests are used to determine the magnitude and the sign of the charge on a ceramic particle. Electrophoretic mobilities were measured using a ZETASIZER 3 from Malvern Instruments. The electrophoretic-mobility measurements were converted to zeta potentials using Henry's equation. These measurements are preferably performed on dilute solutions. Therefore, the suspensions as made above were centrifuged and thereafter carefully decanted into a beaker. The process of decanting mixed a small amount of sediment with the supernatant, thereby forming a dilute solution which was used to evaluate zeta potentials.

The suspension stabilities were determined by sedimentation tests. Sedimentation tests were performed by preparing two-volume-percent suspensions as discussed above. Thereafter, 100 milliliters of each such suspension were placed in a conical-bottom, graduated tube and left undisturbed at room temperature for at least 5 hours. The sedimentation heights of the solid particles in each tube then were monitored. Sedimentation that grows from the bottom of the tube to the top indicates a dispersed suspension. Sedimentation that settles from the top to the bottom of the tube indicates a flocculated suspension. Moreover, dispersed suspensions produce a very cloudy supernatant, where as flocculated suspensions leave behind a substantially less turbid supernatant.

Each suspension was stirred for at least 10 minutes twice daily and the above sedimentation tests were repeated.

B. Dispersion Results

It can be seen from Table II that benzoic acid does not have an hydroxyl group. Zeta potential tests performed on yttria suspensions revealed that benzoic acid did not substantially alter the charge on $Y_2O_3$ in any pH range. On the other hand, 2,3-dihydroxybenzoic acid, citric acid and PMAA altered the particle charge substantially. These results show that benzoic acid is not a suitable dispersing agent because it does not adsorb onto the surface of ceramics.

Without limiting the invention to one theory of operation, it appears that the hydroxyl group enhances the adsorption of the non-polymeric organic compound onto the colloidal particle, thereby forming a barrier between the surface and water molecules. Moreover, as the non-polymeric organic compound adsorbs to the particle, it appears that, within certain pH ranges, the change of the increases. This in turn increases the electrostatic repulsion between particles and induces dispersion.

The results of sedimentation tests with the acids shown in Table II illustrated that stearic acid did not disperse any of the tested ceramics in water. This apparently is because stearic acid is insoluble in water.

2-volume percent suspensions of alumina were combined with 0.5 weight-percent [bdw (based on dry weight) of alumina] citric acid, 2,3-dihydroxybenzoic acid, and PMAA. These suspensions were stable at a pH of about 9. The suspensions were continuously monitored for two months, and remained stable over this period of time.

The sedimentation results for yttria and magnesia suspensions were different from that of alumina. MgO suspensions (2-volume percent) were formed and then 1.0-weight percent (bdw of MgO) of citric acid, PMAA, and 2,3-dihydroxybenzoic acid were added to the suspensions. These suspensions initially were dispersed at a pH of about 11. However, suspensions containing citric acid and PMAA flocculated after less than 20. hours, whereas suspensions containing 2,3-dihydroxybenzoic acid remained dispersed for at least seven days. When the amount of PMAA in the suspension was increased to about 2-weight percent, the suspension stayed dispersed only for about 2.5 days. When the concentration of PMAA was increased to 4-weight percent, the resulting suspension stayed dispersed for about 6.25 days. In contrast, when a suspension was dispersed using 2-weight percent 2,3-dihydroxybenzoic acid, the resulting suspension remained dispersed for more than 9 days.

The same trend was observed with yttria suspensions. 2-volume percent suspensions of yttria with 1.0 weight percent (bdw of yttria) PMAA at a pH of about 8 remained dispersed for a period of about 3 days. In contrast, a 2-volume percent yttria suspension stabilized with 2,3-dihydroxybenzoic acid was monitored for two weeks and remained dispersed throughout this period of time.

Without limiting the present invention to one mode of operation, the mechanism for the transition from a dispersed suspension to a flocculated state appears to occur as follows: As the suspensions are made, the dispersing agents (i.e., citric acid, 2,3-dihydroxybenzoic acid and PMAA) adsorb onto the surface of particles. These adsorbed layers form a barrier between the surface of the ceramic particles and the water molecules, thereby retarding the interaction of the particle surface with water. At the same time, adsorbed layers of acids apparently enhance the charge on the particle, thereby dispersing the suspensions. As interactions between the particle surfaces and water proceeds (even though at a slower pace compared to uncoated particles), yttrium or magnesium ions, or their corresponding cationic hydroxides, dissolve into solution. Dissolved cationic species ($X^{n+}$) then bond themselves with available $COO^-$ (carboxylate) groups as shown in equation (1) below:

$$n\text{-}COO^- + X^{n+} \rightarrow (COO-)_n X \qquad \text{Equation 1}$$

Carboxylate groups may be available for bonding from two sources: (1) excess unadsorbed dispersing agents in solution; and (2) $COO^-$ sites on adsorbed compounds or PMAA molecules which have not formed bonds with the surface of the ceramic particles. As these bonds form, suspensions may flocculate either due to surface-charge neutralization or particle-particle bridging. If additional dispersing agents are added to the suspension, then the suspension will remain dispersed for a longer period of time. However, as dissolution proceeds, eventually all carboxylate groups are accounted for, and the suspension eventually flocculates. Moreover, for ceramics such as MgO, as dissolution proceeds the particles eventually break down, thereby exposing fresh particle surfaces to attack by the aqueous medium. As the particles breakdown, any excess dispersing agent that is available in solution will adsorb to the new particle surfaces, thereby further reducing the concentration of available $COO^-$ sites.

Both citric acid and PMAA have a plurality of carboxylate functional groups sites. Some of these carboxylate groups adsorb onto the surface; the remaining sites are exposed for bonding according to equation 1. On the other hand, 2,3-dihydroxybenzoic acid has only one carboxylate group per monomer. Its only carboxylic site most probably is adsorbed on the surface, leaving no ionized sites for bonding with dissolved ions according to equation 1.

Without limiting the invention to one theory of operation, it appears that hydroxylated organic compounds having a single ionic absorbing site are capable of substantially increasing the charge on ceramic colloidal particles, thereby inducing colloidal dispersion. More importantly, it appears that such compounds are capable of improving the shelf life of ceramic colloidal suspensions in which particles partially dissolve in water. Moreover, such compounds appear to be capable of substantially improving the shelf life of ceramic colloidal suspensions in which dissolving species have opposite charges as compared to the ionic charge of the dispersing agents.

Examples of ceramic particles that may be stabilized in aqueous suspensions according to the present invention include, but are in no way restricted to, any oxide, nitride, or carbide of Mg, Ca, Y, Ge, Ni, Zr, Ti, La, Sr, Ba, Li. The examples listed above are chosen such that at least some of the dissolving ionic species have opposite charge as compared to the ionic charge of the dispersing agents. Such systems facilitate interactions between dissolved ions and the nonadsorbed ionic sites of dispersing agents, and hence experience short colloidal stability lifetimes. Additional examples of ceramic particles include the family of perovskites and high $T_c$ superconductors. Hydroxylated organic compounds that include only one carboxyl functional group, sulphonic acid functional group or a phosphoric acid functional group, are suitable stabilizing agents. Further examples may include any oxide, nitride or carbide of Si as the ceramic particle, whereas the hydroxylated-dispersing agents would comprise amines or quaternary ammonium salts that have only one ionic site.

In summary, the presence of a hydroxyl group enhances the ability of the non-polymeric organic compound to disperse water-reactive colloidal ceramics. Moreover, for compounds that contain one anchoring site, such as a carboxyl group, and have similar structures, it appears that the more hydroxyl groups a compound includes, the better the compound functions as a dispersant. It also appears that since aqueous solubility of organic compounds decreases with increasing carbon-chain length, there is likely an upper limit to the number of carbon atoms that can be found in a dispersant. This point is supported by the inability of water-insoluble stearic acid to disperse any of the tested ceramics. For purposes of this application, the number of carbon atoms for alkyl compounds is less than about 10.

Contrary to Graule, it was determined that hydroxylated carboxylic acids having more than one carboxylic-acid group per molecule were not good candidates for dispersing water-reactive colloidal suspensions. Rather, a more important feature is to increase the number of hydroxyl groups.

The following Examples, which are to be considered as exemplary only and in no way limiting the invention, describe the stabilizing effect of hydroxylated non-polymeric compounds. The Examples also teach how to make and use stabilized colloidal suspensions comprising ceramic particles and hydroxylated non-polymeric organic compounds.

EXAMPLE 1

This Example describes the preparation of yttrium-oxide suspensions that also included either benzoic acid or 2,3-dihydroxybenzoic acid The behavior of the suspensions were compared to the behavior of a pure yttria suspension.

98 grams of deionized water were placed in a container. To the deionized water was added 0.3 grams of either benzoic acid or 2,3-dihydroxybenzoic acid. This mixture was thereafter stirred continuously until the acid had completely dissolved. 10 grams of yttrium-oxide powder then were added to the deionized water with continuous stirring. The pH of the suspension was adjusted by the addition of reagent grade NaOH.

A pure yttrium-oxide suspension was made by placing 98 grams of deionized water in a container. To the deionized water was added 2 grams of yttrium-oxide powder with continuous stirring. The pH of the suspension was adjusted by the addition of reagent grade HCl or NaOH.

Electrophoretic mobilities then were measured versus pH by centrifuging the above suspensions and using the decanted supernatants for measurements.

FIG. 1 is a graph of the zeta potential of a yttrium-oxide suspension made with and without added hydroxylated carboxylic acids. FIG. 1 shows that 2,3-dihydroxybenzoic acid substantially alters the charge on yttrium oxide. On the other hand, benzoic acid, which does not include hydroxyl groups, hardly has any effect on the particle charge.

The effects of 2,3-dihydroxybenzoic acid are even more noticeable at pH values below about 8. At these pH values, yttrium-oxide particles are positively charged. Under these conditions, substantial amounts of adsorption of 2,3-dihydroxybenzoic-acid monomers occur on the particle surface as is evidenced by the charge reversal shown in FIG. 1.

Thermogravimetric analysis (TGA, which is a measure of the weight loss of a substance versus temperature) of centrifuged yttria powder has shown that at a pH of about 4, as much as 2-weight percent, 2,3-dihydroxybenzoic acid adsorbs on the surface of yttria. An increase in the charge on the particles as a result of adsorption of 2,3-dihydroxybenzoic acid to yttria, especially at pH values greater than about 8 (see FIG. 1), enhances the aqueous colloidal dispersion of yttria. At the same time, as illustrated below in Example 4, this adsorption of monomer onto the particle surface substantially reduces the dissolution of such particles. Furthermore, as shown in FIG. 1, benzoic acid (which has no hydroxyl groups and apparently results in insufficient monomer adsorption) neither enhances colloidal dispersion, nor provides a barrier between the surface of the particles and water molecules.

EXAMPLE 2

This Example describes the preparation of a colloidal suspension of yttrium oxide with PMAA or 2,3-dihydroxybenzoic acid as dispersing agents.

To prepare the yttrium-oxide/PMAA suspension, 98 grams of deionized water were added to 0.1 grams of PMAA with stirring until the PMAA dissolved. The pH was adjusted to 8 by the addition of NaOH. 10 grams of yttrium-oxide powder were added to this solution. The pH again was adjusted to be about 8 by the addition of NaOH. The resulting mixture was placed in an ice bath. The mixture then was ultrasonicated for two minutes at 58W using a Fisher Sonic Dismembrator, Model Number 300. This suspension was poured into a graduated cylinder. The pH of the solution constantly was monitored to ensure that the pH value never differed from the target value by more than about 0.05 pH units.

In a manner similar to that discussed above, 0.1 grams of 2,3-hydroxybenzoic acid was mixed in water to form a yttria-hydroxylated carboxylic acid monomer suspension.

Figure 2:
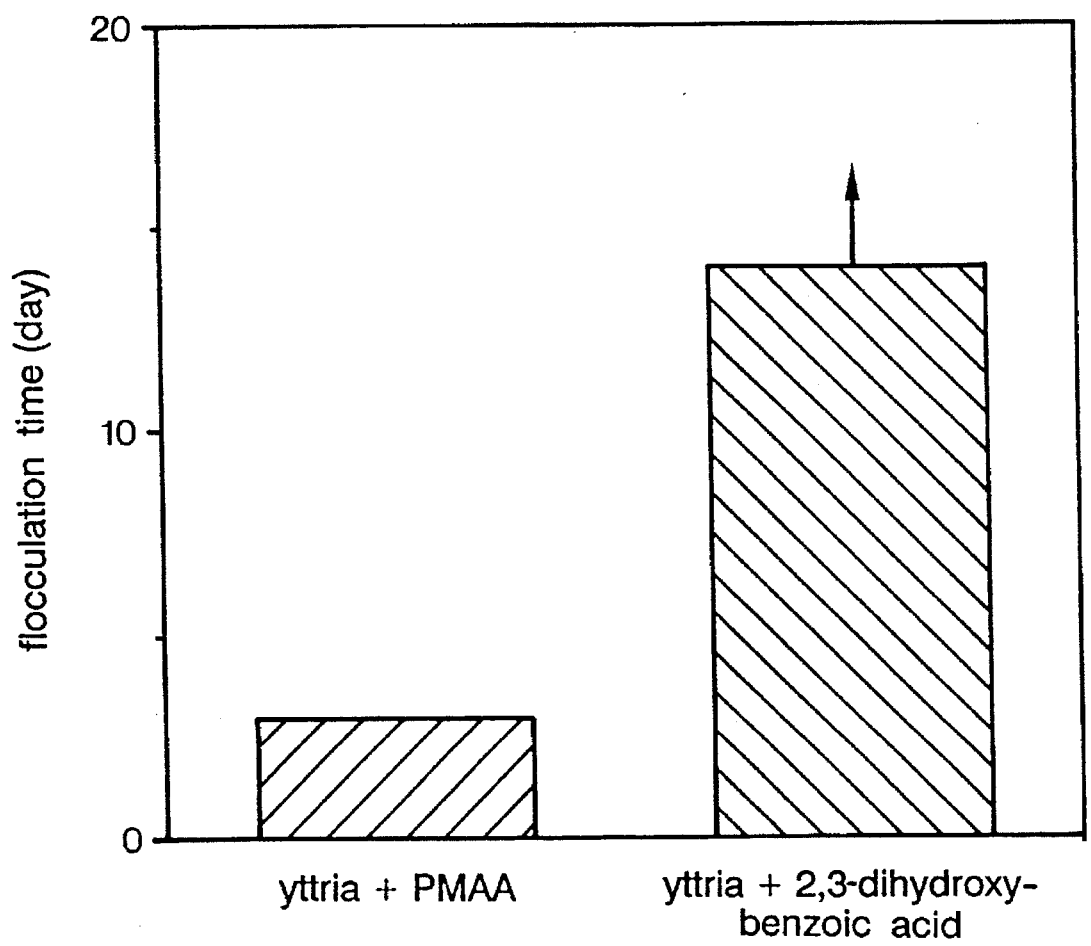
FIG. 2 is a graph of flocculation time (days) for a yttrium-oxide suspension with poly(methacrylic acid) (PMAA) and 2,3-dihydroxybenzoic acid.

FIG. 2 compares the flocculation time of the yttrium-oxide/PMAA suspension with the yttria-hydroxylated carboxylic acid monomer suspension. The flocculation time for PMAA only was about 3 days. The 2,3-dihydroxybenzoic acid suspension was monitored for at least two weeks and remained stable throughout this entire period of time.

EXAMPLE 3

This Example describes the preparation of stable colloidal suspensions of magnesium oxide and PMAA, citric acid, and 2,3-dihydroxybenzoic acid. To prepare the magnesium-oxide suspensions, 98 grams of deionized water were placed in a container. To the deionized water was added specific amounts of PMAA with stirring until the PMAA dissolved. The pH was adjusted to 11 by the addition of NaOH. To this solution was added 6.4 grams of magnesium-oxide powder. The pH was adjusted to 11 by the addition of NaOH. The resulting mixture was placed in an ice bath. The mixture was then ultrasonicated for two minutes at 58W using a Fisher Sonic Dismembrator, Model Number 300. Suspensions made in this manner were poured into graduated cylinders. The pH of the solution constantly was monitored to ensure that the pH value never differed from the target value by more than about 0.05 pH units.

In a manner similar to that discussed above, specific amounts of citric acid, 2,3-dihydroxy acid monomer or PMAA were mixed in water to form compositions having from about 0.75 weight-percent to about four-weight percent carboxylic-acid monomer or PMAA. These solutions were used to evaluate the ability of carboxylic-acid monomers to disperse magnesium-oxide suspensions relative to PMAA.

Figure 3:
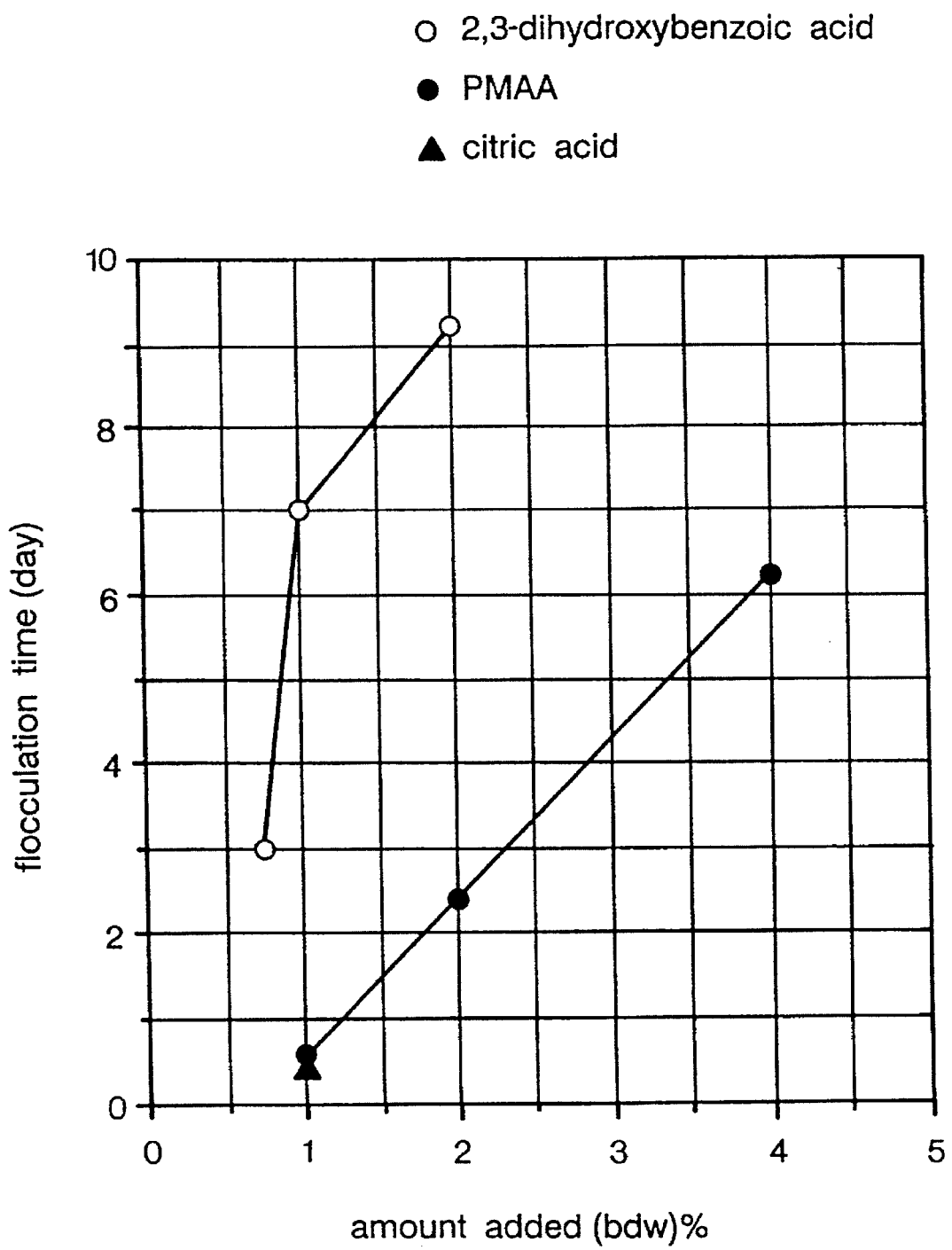
FIG. 3 is a graph of the amount (percent dry weight) of poly(methacrylic acid) (PMAA) and carboxylic-acid monomers added to a MgO suspension versus flocculation time (days).

FIG. 3 shows the amount of PMAA or carboxylic-acid monomer added to the colloidal suspension of magnesium oxide versus flocculation time (days). A particularly suitable acid was found to be 2,3-dihydroxybenzoic acid, as shown in FIG. 3. At concentrations of about one percent, the flocculation time for PMAA or citric acid was about 12 hours. In contrast, the flocculation time for a colloidal magnesium-oxide suspension with about 1 percent 2,3-dihydroxybenzoic acid was considerably longer, and typically was about 7 days.

FIG. 3 also shows that to achieve a particle dispersion using PMAA that is comparable to that obtained using one weight-percent 2,3-dihydroxybenzoic acid, the amount of PMAA added had to be increased up to about four-weight-percent. It previously has been found that excess unadsorbed polyelectrolytes such as PMAA reduce the maximum amount of ceramic particles that can be added to the suspension, thereby making such suspensions unacceptable for ceramic processing. Therefore, such PMAA concentrations are unacceptable.

C. Dissolution and Hydration of Ceramics

Based on the evidence presented herein, non-polymeric organic compounds having only one anchoring site, such as hydroxylated carboxylic acid monomers with a single carboxyl or carboxylate functional group, are good colloidal dispersants for ceramics having a high rate of dissolution. Ceramic materials that are not coated with such monomers either are impractical to process in an aqueous environment or are difficult to process. Examples 1–3 demonstrate the ability of non-polymeric hydroxylated organic compounds to stabilize ceramic suspensions, such as magnesium oxide and yttrium oxide colloidal suspensions, thus preventing these suspensions from agglomerating for extended periods of time. The relatively long suspension lifetimes demonstrated by the suspensions described in Examples 1–3 clearly demonstrate that adsorbed monomers prevent, or substantially reduce dissolution of the metal-oxide particles.

The following discussion and Examples provide more direct evidence that the compounds of the present invention prevent or substantially reduce dissolution and hydration of ceramic particles, such as magnesium-oxide and yttrium-oxide particles.

The general procedure for making suspensions was the same as described above in Section A. Following the formation of suspensions according to this procedure, the dissolution and hydration of the colloidal particles were tested.

The dissolution rate of colloidal particles was measured from the pH change that occurred with the suspensions. The pH was measured with an Ag/AgCl glass pH electrode and recorded versus time.

Thermogravimetric analysis was used to determine the hydration of the MgO powder in the suspension. The MgO (2-volume percent) suspensions; were prepared in either (1) distilled water, or (2) in a 2-weight percent PMAA (dwb of MgO) solution. A small amount of each such suspension (the suspensions were continuously stirred) was dried at 110° C. The dried powder then was placed in a platinum pan and heated in air at a rate of about 5° C./min. The sample weight was recorded automatically against temperature using a TGA 7 Thermogravimetric Analyzer, Perkin-Elmer, Norwalk, Conn.

The dehydration of $Mg(OH)_2$ is known to occur at about 350° C. The weight loss while raising the temperature from 200° C. to 800° C. was determined from the chart prepared by the Thermogravimetric Analyzer and was used to calculate the amount of $Mg(OH)_2$ in the sample.

The surface area of the particles was measured versus time. Small amounts of each suspension (which was stirred continuously) was dried in a vacuum at room temperature. The surface area of the dried powder was measured using standard BET $N_2$ adsorption using a single point surface area measurement. These measurements were taken with a Flowsorb II 2300, Micrometrics, Norcross, Ga.

D. Dissolution and Hydration Results

Dissolution of yttria in water becomes substantially rapid at pH values below 7. As used herein, "substantially rapid" means that a ceramic, such as yttria, dissolves sufficiently to raise the pH of the solution more than one pH unit in a period of about 2 hours. Sufficient quantities of colloidal particles may dissolve in a matter of minutes to push the pH higher than 7. The pH increase occurs as a result of hydration of dissolved yttria. This causes hydroxyl groups to be released, thereby increasing the pH of the suspension. However, if the yttria particles were coated with 2,3-dihydroxybenzoic acid, the pH did not increase in the same fashion as did non-coated yttria particles. The pH of the suspension containing coated yttria particles remained below 4 for many days. Without limiting the invention to one theory of operation, it appears that the adsorbed layer of hydroxylated non-polymeric compound provides the surface of colloidal with a sufficient barrier to protect the particle from attack by water molecules.

Magnesium-oxide particles in a 2-volume percent aqueous suspension were totally hydrated in about 200 hours. A MgO oxide suspension made using 1-weight percent 2,3-dihydroxybenzoic acid hydrated only about 40% during the same time interval.

Surface-area measurements of the above suspensions showed a similar trend. The surface areas of particles in suspension with no coating increased from 7.5 $m^2/g$ to about 19 $m^2/g$ in less than 20 hours. On the other hand, the surface areas of particles in a MgO suspension with 0.75 weight percent 2,3-dihydroxybenzoic acid stayed below 10 $m^2/g$ even after 35 hours of aging.

The results of hydration and surface area further support the usefulness of the above monomers as effective coating agents. Moreover, based on the evidence presented herein, hydroxylated non-polymeric organic compounds having a single anchoring site, such as hydroxylated carboxylic acid monomers having a single acid functional group, are good colloidal-particle dispersants. Moreover, such compounds prevent or substantially reduce the hydration and dissolution of the ceramic particles. Although the data presented above is particularly directed to magnesium and yttrium oxide, the same results should hold for colloidal suspensions of other water-reactive ceramics, such as calcium oxide and yttrium oxide.

Moreover, the benzoic acids are not the only acids that will work for stabilizing industrial ceramic suspensions. Alkyl, alkenyl, and alkynyl hydroxylated compounds also will work for the present invention, as long as they contain only one anchoring site, preferably a carboxylic acid functional group. Such compounds also preferably include a plurality of hydroxyl functional groups, and preferably include at least two functional groups.

Moreover, functional groups (anchoring sites) other than carboxyl groups may be used, as long as such groups are ionized in such a manner that allow such groups to adsorb onto the surface of particles of interest. For example, if a particle surface has an overall positive charge, then anchoring sites should be negatively charged and vice versa.

Suitable functional groups are selected from the group consisting of a carboxyl, a carboxylate, a sulfonic acid, a sulfonate, a phosphoric acid, a phosphate, an amine, and a quaternary ammonium salt. Hence, suitable hydroxylated non-polymeric organic compounds may be selected from the group consisting of hydroxylated carboxylic acids, hydroxylated carboxylates, hydroxylated sulfonic acids, hydroxylated sulfonates, hydroxylated phosphoric acids, hydroxylated phosphates, hydroxylated amines or hydroxylated quaternary ammonium salts. Particularly suitable monomers are selected from the group consisting of hydroxylated carboxylic acids and hydroxylated carboxylates. Hydroxylated carboxylic acids may be selected from the group consisting of hydroxylated lower-alkyl carboxylic acids, hydroxylated lower-alkenyl carboxylic acids, hydroxylated lower-alkynyl carboxylic acids, hydroxylated aromatic carboxylic acids, and combinations thereof. Without limitation, preferred hydroxylated carboxylic acid monomers include the hydroxylated benzoic acids.

The solubility of the hydroxylated carboxylic acids also must be considered. The greater the number of carbon atoms, the less soluble the materials are in water. Hence, certain long-chain hydrocarbons may not be useful for stabilizing ceramic particles in aqueous suspensions. However, the lower alkyl hydroxylated carboxylic acid monomers all should stabilize metal-oxide suspensions. As used herein, the term lower alkyl refers, without limitation, to organic compounds having fewer than about 10 carbon atoms.

Preferably, the organic compound is selected from the group consisting of a hydroxylated carboxylic acid and a hydroxylated carboxylate, such as the group consisting of hydroxylated benzoic acids. For instance, the organic compound may comprise a hydroxylated carboxylic-acid according to the formula

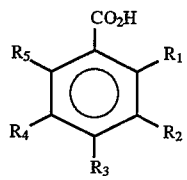

wherein at least one, and preferably at least two, of $R_1$–$R_5$ are hydroxyl. Without limitation, a suitable non-polymeric compound for the present invention is an organic compound according to the formula wherein at least one of $R_1$–$R_6$ is a hydroxyl group, at least one of $R_1$–$R_6$ is selected from the group consisting of a carboxyl and a carboxylate (although at least one of $R_1$–$R_6$ may be selected from the group consisting of a sulfonic acid, a sulfonate, a phosphoric acid, a phosphate, an amine, and a quaternary ammonium salt), and the remainder of $R_1$–$R_6$ are selected from the group consisting of hydroxyl and hydrogen. Preferred compounds according to this formula have (1) at least one functional group selected from the group consisting of a carboxyl and a carboxylate, (2) at least two hydroxyl groups, wherein $R_1$ and $R_2$ or $R_3$ preferably are hydroxyl, preferably $R_2$, and the remainder of the R groups are hydrogen or hydroxyl.

The following Examples describe the surface protection effect of hydroxylated non-polymeric organic compounds and how to make and use colloidal suspensions comprising ceramic particles and non-polymeric organic compounds.

EXAMPLE 4

This Example describes the preparation of a stabilized yttrium-oxide suspension, which was made using 2,3-dihydroxybenzoic acid. The behavior of the stabilized suspension was compared to the behavior of a pure yttria suspension. 98 grams of deionized water were placed in a container. To the deionized water was added 0.3 grams of 2,3-dihydroxybenzoic acid. This mixture was thereafter stirred continuously until the acid had completely dissolved. 10 grams of yttrium oxide powder then were added to the deionized water with continuous stirring. The pH of the suspension was adjusted to a pH of 2.5 by the addition of HCl. The change in pH thereafter was monitored versus time.

A pure yttrium-oxide suspension was made by placing 98 grams of deionized water in a container. To the deionized water was added 10 grams of yttrium-oxide powder with continuous stirring. The pH of the suspension was adjusted to a pH of 2.5 by the addition of HCl. The change in pH thereafter was monitored versus time.

Figure 4:
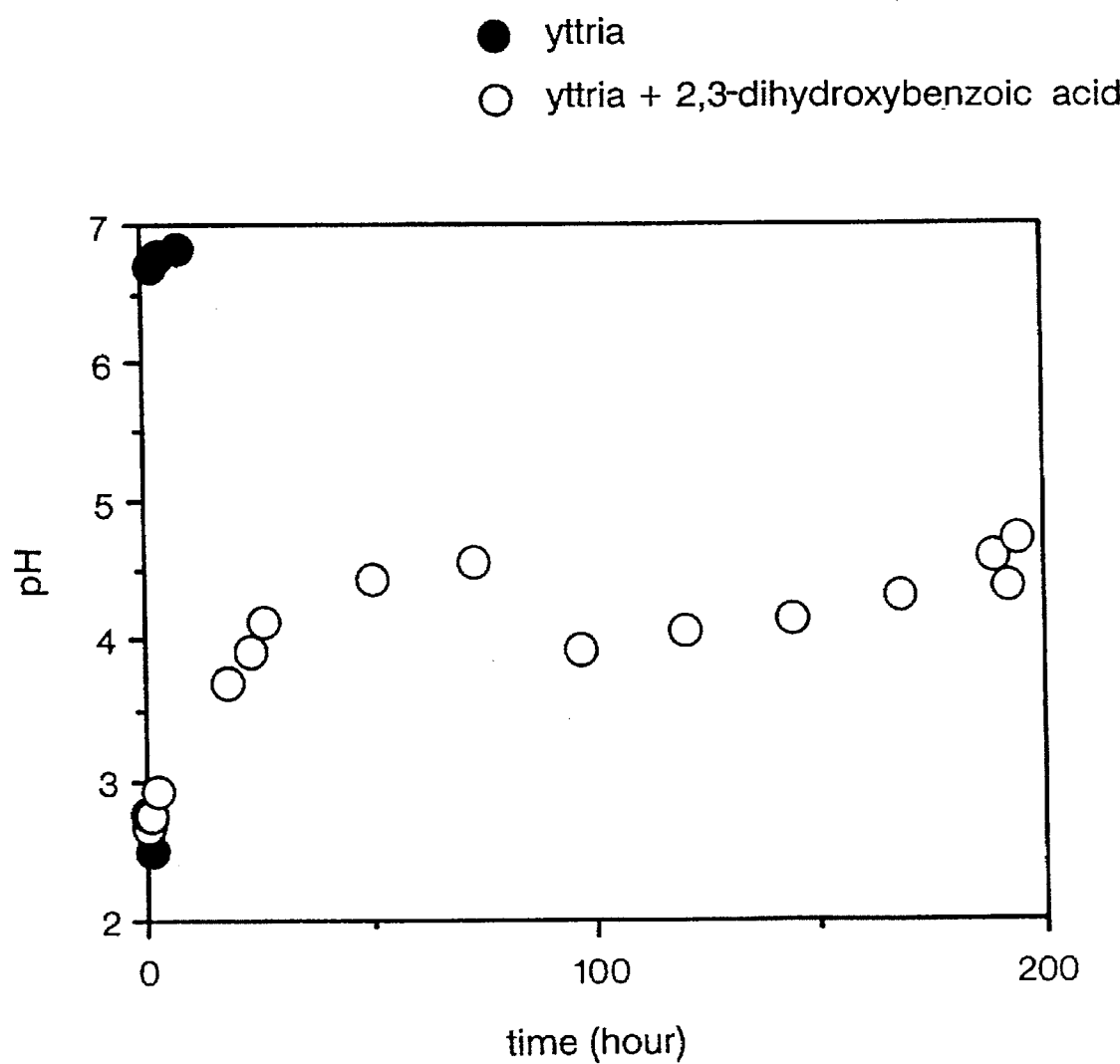
FIG. 4 is a graph showing the dissolution of yttria with and without 2,3-dihydroxybenzoic acid.

FIG. 4 shows a clear difference between the pH of a suspension made using pure yttrium oxide versus a suspension made using both yttrium oxide and hydroxylated carboxylic acid. The suspension made with pure yttrium oxide shows a rapid pH increase to about 7. The yttrium-oxide suspension made using an hydroxylated carboxylic acid monomer did not show such a rapid increase in pH, and obtained an equilibrium pH of about 4–4.5. The rapid increase in pH associated with the pure yttrium-oxide suspension indicated that the yttrium-oxide particles were being dissolved and consequently hydrated, and that the hydrated particles were releasing hydroxyl groups into solution. This results in a rapid increase in the pH of the solution.

In contrast, the yttrium-oxide particles treated with 2,3-dihydroxybenzoic acid are not as rapidly attacked by water molecules, and therefore do not release hydroxyl groups into solution. This clearly shows that the hydroxylated non-polymeric organic compounds of the present invention perform quite well in preventing the hydration and subsequent dissolution of metal-oxide particles.

EXAMPLE 5

This Example evaluates the hydration of colloidal magnesium-oxide particles in an aqueous suspension that includes 2,3-dihydroxybenzoic acid. A control colloidal magnesium-oxide suspension was made by adding magnesium oxide to deionized water as described above for Example 1. A second aqueous suspension of magnesium oxide also was made as described above for Example 1, wherein the suspension included about one-weight-percent 2,3-dihydroxybenzoic acid.

The extent to which the metal oxide was hydrated under these conditions was determined by isolating the magnesium oxide, weighing the magnesium oxide, and then drying the magnesium oxide. The difference between the isolated weight and the weight following drying was used to determine the degree of metal-oxide particle hydration.

Figure 5:
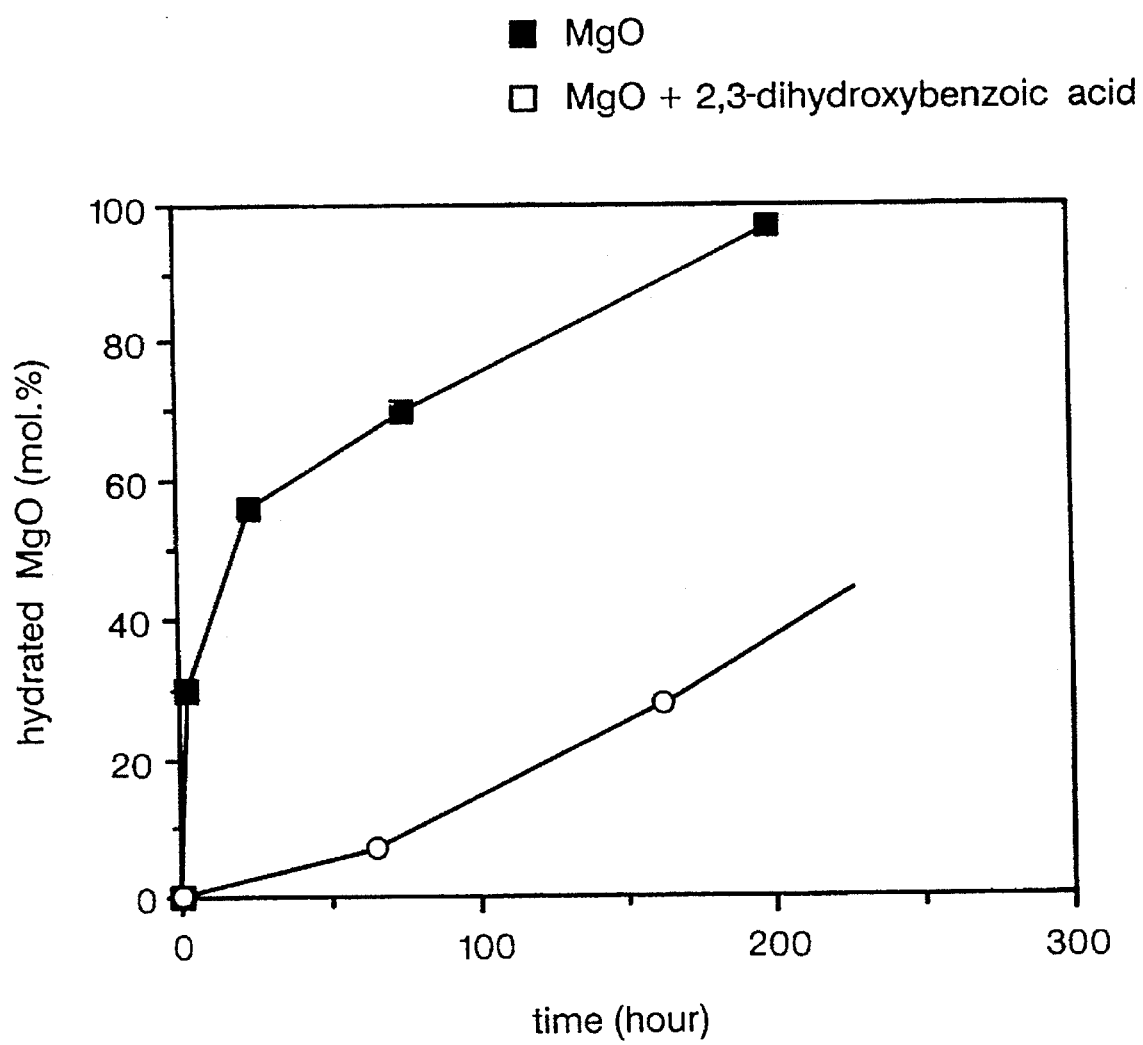
FIG. 5 is a graph of time (hours) versus mole percent magnesium-oxide hydration with and without treatment with a hydroxylated carboxylic-acid monomer.

FIG. 5 shows the hydration of magnesium-oxide particles in water with and without 2,3-dihydroxybenzoic acid. FIG. 5 is graph of the time (hours) versus the mole percent of hydrated magnesium oxide. The curve for the hydration of magnesium oxide without added hydroxylated carboxylic acid shows that magnesium oxide is rapidly hydrated. After a period of about 200 hours, the magnesium-oxide particles are substantially completely hydrated.

However, when one-weight-percent 2,3-dihydroxybenzoic acid is added to the magnesium-oxide suspension, the hydration of the metal-oxide particles is substantially reduced. More specifically, after a period of about 50 hours, at which time about 60 percent of the magnesium oxide is hydrated without 2,3-dihydroxybenzoic acid, less than about ten-mole-percent of the magnesium-oxide particles were hydrated. After a period of about 200 hours, the magnesium-oxide particles without added 2,3-dihydroxybenzoic acid were substantially completely hydrated, whereas the suspension with added 2,3-dihydroxybenzoic acid had a percent molar hydration of only about 40 percent.

EXAMPLE 6

This Example shows the surface-area increase of colloidal magnesium-oxide particles in an aqueous suspension that includes 2,3-dihydroxybenzoic acid. A control colloidal magnesium-oxide suspension was made by adding magnesium oxide to deionized water as described above for Example 1, wherein the suspension included about 0.75 weight-percent 2,3-dihydroxybenzoic acid.

The extent to which the surface area of the metal oxide was increased under these conditions was determined by isolating the magnesium oxide, and then drying the magnesium oxide under vacuum. The surface area of the dried powder then was measured by standard BET $N_2$ adsorption.

Figure 6:
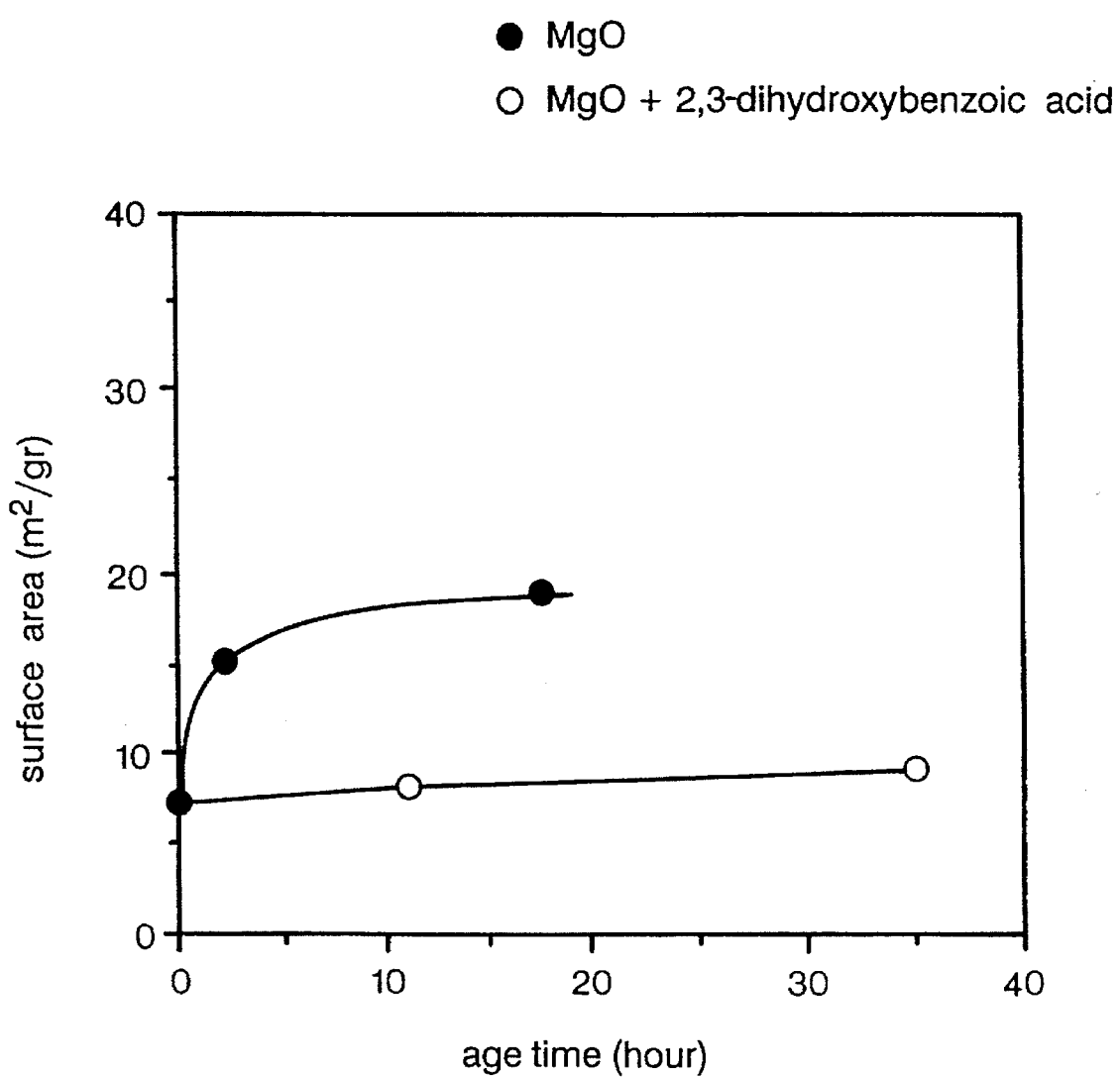
FIG. 6 is a graph of aging time (hours) versus surface-area-increase for magnesium oxide in water with and without hydroxylated carboxylic-acid monomer.

FIG. 6 shows the increase in surface area of magnesium-oxide particles in water with and without 2,3-dihydroxybenzoic acid. FIG. 6 is a graph of the time (hours) versus the surface area of magnesium oxide. The curve for the surface area of magnesium oxide without added hydroxylated carboxylic acid shows that the surface area of magnesium oxide had rapidly increased. After a period of about 20 hours, the surface area of magnesium-oxide particles increased from an initial surface area of about 7 $m^2/g$ to about 19 $m^2/g$.

However, when 0.75 weight-percent 2,3-dihydroxybenzoic acid was added to the magnesium-oxide suspension the increase in surface area of the metal-oxide particles was substantially reduced. More specifically, after a period of about 35 hours, the surface area of magnesium-oxide particles increased from an initial surface area of about 7 $m^2/g$ to only about 9 $m^2/g$.

II. Hydroxylated Non-Polymeric Organic Compounds as Ceramic Processing Aid in Solution of Silicontetraethoxide (TEOS)

Yttrium oxide is a particularly suitable metal oxide for forming ceramic molds. Yttrium-oxide slurries are used to produce internal surfaces of molds used for casting reactive metals such as titanium. Conventionally, TEOS is added to such slurries as a source of inorganic binder. In order to increase slurry life time, the pH normally is maintained at about 2. At this pH, condensation polymerization between hydrolyzed TEOS molecules is minimal. And, as a result, the working life time of the slurry, that is before the suspension forms a semi-solid network of —Si—O—Si— bonds, is extended.

The presence of metal oxide in TEOS solution normally decreases the life time of the slurry. This is because metal oxides normally dissolve, at least to some extent, in acidic solutions. As the oxide dissolves, it hydrates and releases hydroxide ions into solution, thereby increasing the pH. As the pH increases, the rate of condensation of TEOS increases, and slurry life time decreases. TEOS solutions are particularly sensitive to the presence of yttrium oxide as the extent and rate of dissolution of yttrium oxide in acidic solutions is higher than many other commercial metal-oxides used in industry.

From about 0.1 to about 5.0-weight-percent of the hydroxylated compounds of the present invention may be added to colloidal suspensions of yttrium oxide to produce a stabilized, and therefore more useful, colloidal suspension of yttrium oxide in TEOS solution for forming ceramic molds.

Example 7 describes how a composition can be made having both colloidal yttrium-oxide particles and hydroxylated carboxylic-acid monomers.

EXAMPLE 7

A ceramic binder system was made by combining partially hydrolyzed TEOS (Union Carbide ES40, 18.59 weight percent), ethyl alcohol (190, 37.18 weight percent), glycol ether EP (25.49 weight percent), glycol ether PM (17 weight percent), HCl (30% assay, 0.52 weight percent) and deionized water (1.23 weight percent). These ingredients and weight percents are listed below in Table 2. To 16.5 grams of this mixture were added 70 grams of yttria powder having an average particle size of about 2 μm.

A second slurry was prepared by first making a suspension as described above in Example 4, wherein the yttria particles were coated with a hydroxylated carboxylic acid monomer. After vacuum drying the above suspension at room temperature, 70 grams of the coated particles then were added to 16.5 grams of the binder mixture prepared as described above. Both slurries were kept in containers and the pH value of each suspension was monitored versus time. The suspensions were continuously stirred with a magnetic stirrer at about 100 rpm. The measured pH value of the slurry without added hydroxylated carboxylic acid monomer raised quickly to about 5.5, as a result of yttria dissolution. The higher pH values resulted in the polymerization of ethyl silicate, which caused the suspension to gel. The suspension having added hydroxylated carboxylic acid monomer has a more stable pH, and no suspension gelling was observed even after monitoring the suspension for six days.

TABLE 2

| Materials | Weight Percent |
| --- | --- |
| Ethyl Silicate (Union Carbide ES 40) | 18.59 |
| Ethyl Alcohol 190 | 37.18 |
| Glycol Ether EP | 25.49 |
| Glycol Ether PM | 17 |
| HCl (30% assay) | 0.5 |
| Deionized water | 1.23 |

Figure 7:
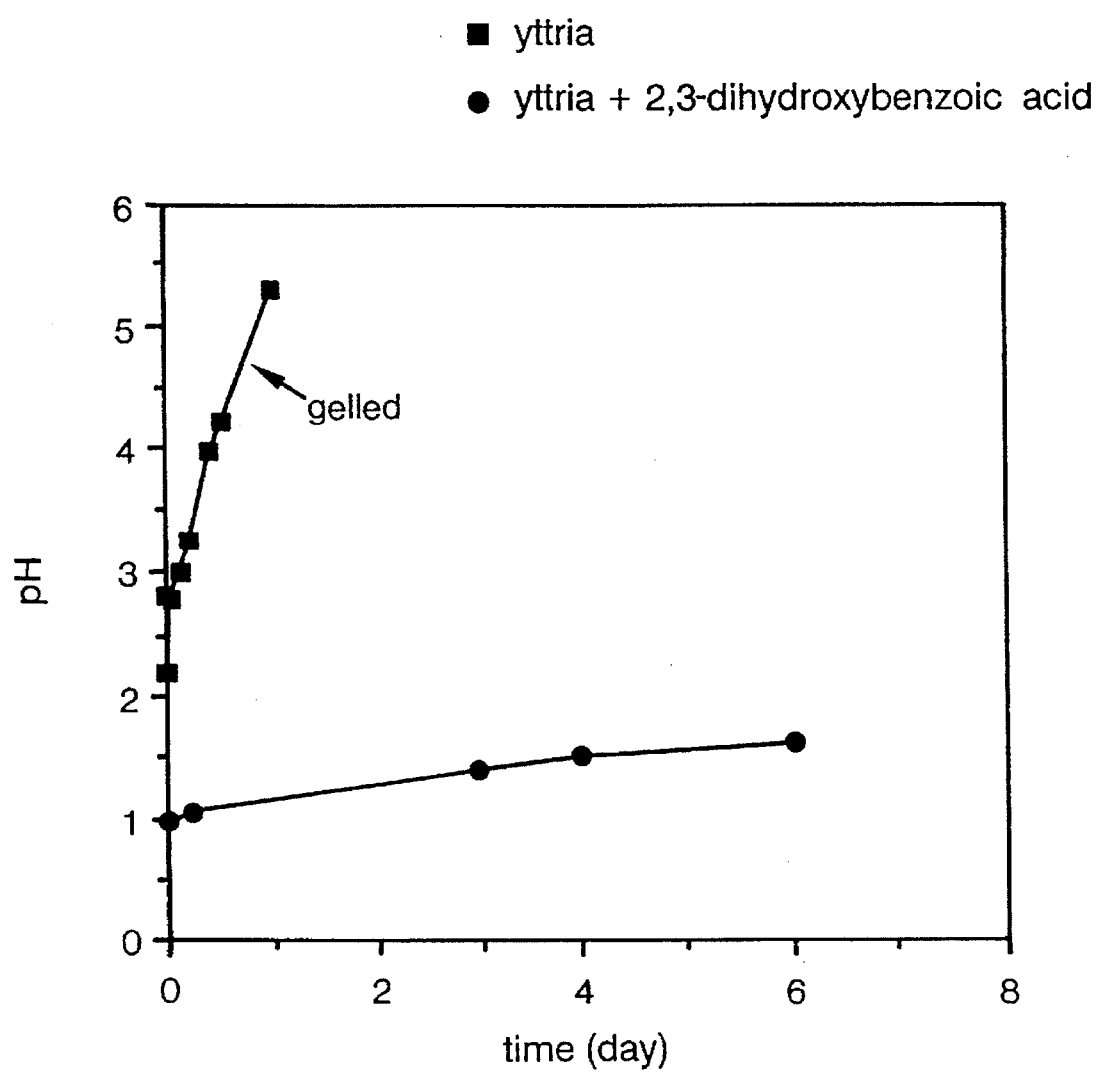
FIG. 7 is a graph showing the pH change and gelation of a yttrium oxide suspension in TEOS solution with and without 2,3-dihydroxybenzoic acid addition.

FIG. 7 is a graph of the pH of the above yttrium-oxide suspension versus time (days) wherein the suspension includes 2,3-dihydroxybenzoic acid. FIG. 7 clearly shows that suspensions made with yttrium-oxide particles that are not coated with the monomers of the present invention gel quickly, and are unusable within a few days. However, the coated particles do not form a suspension that gels, even after a period of six days.

Hence, these results show that the hydroxylated compounds are useful for dispersing and substantially reducing or eliminating the hydration and dissolution of metal-oxide particles in aqueous, as well as semi-aqueous, suspensions. These suspensions are useful for industrial ceramic processes, and the compositions comprising ceramic particles, binders, surfactants, and other ingredients, as well as hydroxylated carboxylic acid monomers, also are useful for industrial ceramic processing.

III. Controlling the Size of Precipitated Ceramic Particles

The present invention also provides a method for controlling the size of ceramic particles produced by precipitation. The method first involves forming a solution of a ceramic material precursor. As used herein, the phrase "ceramic material precursor" refers to a water-soluble species, many of which, but not all, are salts that can undergo a reaction in solution to produce ceramic particles. The ceramic particles thereafter precipitate from solution. Examples of such water-soluble species include, without limitation, halogen metal salts, such as yttrium chloride, barium chloride, titanium chloride, and copper chloride; metal nitrates, such as yttrium nitrate, barium nitrate, titanium nitrate, and copper nitrate; and metal-oxo species such as titanium dioxide.

To precipitate the ceramic particles, a precipitating agent is added to the solution. The precipitating agent may be virtually any basic compound. One skilled in the art will be able to determine, depending upon the particular chemistry involved, a suitable precipitating agent. A presently preferred precipitating agent is ammonia. Ammonia may be bubbled through the solution of the ceramic material precursor to precipitate the ceramic particles.

From about 0.1 weight percent to about 5.0 weight percent, based on the dry weight of the ceramic, preferably from about 0.1 weight percent to about 1.0 weight percent, based on the dry weight of the ceramic, of a non-polymeric compound is added to the solution The non-polymeric organic compound has at least one hydroxyl group. The compound also has a functional group selected from the group consisting of a carboxyl, a carboxylate, a sulfonic acid, a sulfonate, a phosphoric acid, a phosphate, an amine, and a quaternary ammonium salt. The non-polymeric organic compound is added to the solution either simultaneously with the addition of the precipitating agent or immediately thereafter. Without limiting the invention to one theory of operation, it is believed that the non-polymeric organic compound prevents the precipitated ceramic particle from nucleating and forming agglomerated particles of increased size and decreased uniform morphology. It will be apparent to one skilled in the art that the size of the particles can be controlled by varying the time when the non-polymeric compound is added to the solution. If small, non-nucleating particles are needed, then the non-polymeric compound should be added to the solution virtually simultaneously with the addition of the precipitating agent. If larger particles are required, then the non-polymeric compound should be added after the precipitating agent is added to the solution.

The non-polymeric organic compound typically has a plurality of hydroxyl groups, and the functional group preferably is selected from the group consisting of a carboxyl and a carboxylate. By way of example, the non-polymeric organic compound may be selected from the group consisting of a hydroxylated carboxylic acid, a hydroxylated carboxylate, a hydroxylated sulfonic acid, a hydroxylated sulfonate, a hydroxylated phosphoric acid, a hydroxylated phosphate, a hydroxylated amine and a hydroxylated quaternary ammonium salt. Preferred non-polymeric compounds are selected from the group consisting of hydroxylated benzoic acids. The ceramic particles may be selected from the group consisting of metal oxides, wherein metal oxides include perovskites and high $T_c$ superconductors.

The present invention has been described with reference to several preferred embodiments. Other embodiments of the invention will be apparent to those skilled in the art from a consideration of this specification or practice of the invention disclosed herein. It is intended that the specification and examples contained herein be considered as exemplary only, with the true scope and spirit of the invention being indicated by the following claims.

We claim:

1. A method for dispersing aqueous suspensions of reactive, water-soluble ceramics and reducing the rate of ceramic dissolution and hydration to maintain a dispersed suspension for a period of greater than about a day, comprising forming an aqueous ceramic suspension from ingredients comprising from about 0.1 weight percent to about 5.0 weight percent, based on the dry weight of the ceramic, of an organic compound that adsorbs on the surface of the ceramic, the organic compound being selected from the group consisting of hydroxylated benzoic acids.

2. The method according to claim 1 wherein the ceramic is a metal oxide.

3. The method according to claim 2 wherein the metal of the metal oxide is selected from the group consisting of magnesium, calcium and yttrium.

4. The method according to claim 1 wherein the ceramic is selected from the group consisting of perovskites.

5. The method according to claim 4 wherein the perovskite is selected from the group consisting of barium titanate, strontium titanate and lead titanate.

6. The method according to claim 1 wherein from about 0.1 weight percent to about 1.0 weight percent, based on the dry weight of the ceramic, of the organic compound is added to the suspension.

7. An aqueous ceramic composition that remains dispersed for a period of greater than about a day, comprising:

an aqueous suspension of a reactive, water-soluble ceramic; and about 0.1 weight percent to about 5.0 weight percent of an organic compound adsorbed on the ceramic, the organic compound being selected from the group consisting of hydroxylated benzoic acids.

8. The composition according to claim 7 wherein the organic compound has a plurality of hydroxyl groups.

9. The composition according to claim 7 wherein the organic compound comprises a hydroxylated benzoic acid according to the formula

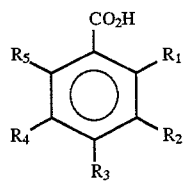

wherein at least one of $R_1$–$R_5$ are hydroxyl and the remainder of $R_1$–$R_5$ are independently selected from the group consisting of hydrogen and hydroxyl.

10. The composition according to claim 7 wherein the organic compound comprises a hydroxylated carboxylic-acid according to the formula

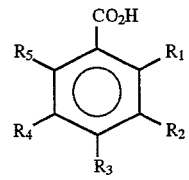

wherein at least two of $R_1$–$R_5$ are hydroxyl and the remainder of $R_1$–$R_5$ are independently selected from the group consisting of hydrogen and hydroxyl.

11. The composition according to claim 7 wherein the ceramic is selected from the group consisting of metal oxides.

12. The composition according to claim 11 wherein from about 0.1 weight percent to about 1.0 weight percent, based on the dry weight of the metal oxide, of the hydroxylated benzoic acid is added to the suspension.

13. The composition according to claim 11 wherein the metal of the metal oxide is selected from the group consisting of magnesium, calcium and yttrium.

14. A method for dispersing aqueous suspensions of reactive, water-soluble ceramics and reducing the rate of ceramic dissolution and hydration to maintain a dispersed suspension for a period of greater than about a day, comprising adding to an aqueous suspension of a reactive, water-soluble ceramic from about 0.1 weight percent to about 5.0 weight percent, based on the dry weight of the ceramic, an organic compound that adsorbs on the ceramic, the organic compound being selected from the group consisting of hydroxylated benzoic acids, the ceramic including a metal selected from the group consisting of alkali metals, alkaline-earth metals and the rare-earth metals.

15. The method according to claim 14 wherein the organic compound has a plurality of hydroxyl groups.

16. The method according to claim 14 wherein the metal is selected from the group consisting of magnesium, calcium and yttrium.

17. The method according to claim 14 wherein the ceramic is selected from the group consisting of metal oxides.

18. A dispersed aqueous composition that remains dispersed for a period of greater than about a day, comprising:

an aqueous suspension of a reactive metal oxide, the metal being selected from the group consisting of alkali metals, alkaline-earth metals and the rare-earth metals; and about 0.1 weight percent to about 5.0 weight percent of a hydroxylated carboxylic-acid adsorbed on the ceramic, the carboxylic acid satisfying the formula

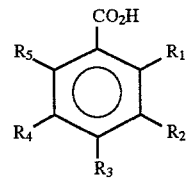

wherein at least one of $R_1$–$R_5$ are hydroxyl and the remainder of $R_1$–$R_5$ are independently selected from the group consisting of hydrogen and hydroxyl.

19. The composition according to claim 18 wherein the hydroxylated carboxylic acid includes a plurality of hydroxyl groups.

20. The composition according to claim 18 wherein at least two of $R_1$–$R_5$ are hydroxyl and the remainder of $R_1$–$R_5$ are independently selected from the group consisting of hydrogen and hydroxyl.

21. The composition according to claim 18 wherein the metal oxide is a perovskite.

22. The composition according to claim 18 wherein the metal is selected from the group consisting of magnesium, calcium and yttrium.

23. A method for dispersing aqueous colloidal suspensions of reactive, water-soluble oxides and reducing the rate of oxide dissolution and hydration so that the suspension remains dispersed for a period of greater than about a day, comprising the steps of:

forming an aqueous suspension of a reactive, water-soluble metal oxide, wherein the metal is selected from the group consisting of alkali metals, alkaline earth metals and the rare-earth metals; and adding to the suspension from about 0.1 weight percent to about 5 weight percent of a carboxylic acid that adsorbs on the ceramic, the carboxylic acid satisfying the formula.

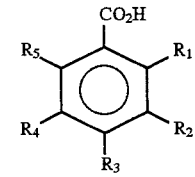

wherein at least one of $R_1$–$R_5$ are hydroxyl and the remainder of $R_1$–$R_5$ are independently selected from the group consisting of hydrogen and hydroxyl.

24. The method according to claim 23 wherein the carboxylic acid has a plurality of hydroxyl groups.

25. The method according to claim 23 wherein the metal is selected from the group consisting of magnesium, calcium and yttrium, and the organic compound is a carboxylic acid according to the formula

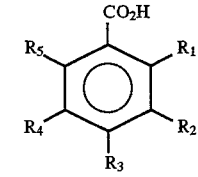

wherein at least two of $R_1$–$R_5$ are hydroxyl and the remainder of $R_1$–$R_5$ are independently selected from the group consisting of hydrogen and hydroxyl.

26. The method according to claim 25 wherein $R_1$ and $R_2$ are hydroxyl and $R_2$–$R_5$ are hydrogen.

27. The method according to claim 25 wherein $R_1$ and $R_5$ are hydroxyl and $R_2$–$R_4$ are hydrogen.

28. The method according to claim 23 wherein the metal oxide is MgO and the carboxylic acid is 2,3-dihydroxybenzoic acid.

29. The method according to claim 23 wherein the metal oxide is $Y_2O_3$ and the carboxylic acid is 2,3-dihydroxybenzoic acid.

30. The method according to claim 23 wherein the metal oxide is MgO and the carboxylic acid is 1,5-dihydroxybenzoic acid.

31. The method according to claim 23 wherein the metal oxide is $Y_2O_3$ and the carboxylic acid is 1,5-dihydroxybenzoic acid.

32. A method for stabilizing aqueous colloidal suspensions of reactive metal oxides so that the suspensions remain dispersed for a period of greater than about a day, comprising forming an aqueous colloidal suspension from ingredients comprising a reactive metal oxide wherein the metal is selected from the group consisting of Ca, Mg, and the rare-earth metals, and from about 0.1 to about 5.0 weight percent of a non-polymeric hydroxylated carboxylic acid that adsorbs on the ceramic, the hydroxylated carboxylic acid satisfying the formula

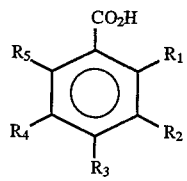

wherein at least two of $R_1$–$R_5$ are hydroxyl and the remainder of $R_1$–$R_5$ are independently selected from the group consisting of hydrogen and hydroxyl.

33. The method according to claim 32 wherein the metal is selected from the group consisting of Ca, Mg and Y, $R_1$ and $R_2$ are hydroxyl, and $R_3$–$R_5$ are hydrogen.

34. The method according to claim 32 wherein from about 0.1 weight percent to about 1.0 weight percent of the carboxylic acid is added to the suspension based on the dry weight of the metal oxide.

35. The method according to claim 32 wherein at least three of $R_1$–$R_5$ are hydroxyl.

36. The method according to claim 32 wherein $R_1$ and $R_2$ are hydroxyl and $R_3$–$R_5$ are hydrogen.

37. The method according to claim 36 wherein the metal oxide is $Y_2O_3$.

38. The method according to claim 36 wherein the metal oxide is MgO.

39. A dispersed aqueous composition that remains dispersed for a period of greater than about a day, comprising:

an aqueous colloidal suspension of a reactive metal oxide, the metal of the metal oxide being selected from the group consisting of Mg, Ca and the rare-earth metals; and from about 0.1 to about 5.0 weight percent, based on the dry weight of the metal oxide, of a non-polymeric carboxylic acid satisfying the formula

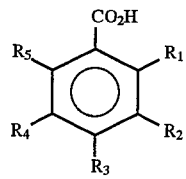

wherein at least two of $R_1$–$R_5$ are hydroxyl and the remainder of $R_1$–$R_5$ are independently selected from the group consisting of hydrogen and hydroxyl.

40. The composition according to claim 39 wherein at least three of $R_1$–$R_5$ are hydroxyl.

41. The composition according to claim 39 wherein the metal oxide is selected from the group consisting of magnesium oxide, calcium oxide and yttria, and the non-polymeric carboxylic acid is a dihydroxybenzoic acid.

42. The composition according to claim 39 wherein the carboxylic acid is 2,3-dihydroxybenzoic acid.

43. The composition according to claim 39 wherein the compound is 1,5-dihydroxybenzoic acid.

44. The composition according to claim 39 wherein the metal is selected from the group consisting of Mg, Ca and Y, and from about 0.1 weight percent to about 1 weight percent, based on the dry weight of the metal oxide, of a dihydroxybenzoic acid is added to the suspension.

45. The composition according to claim 44 wherein the metal oxide is $Y_2O_3$ and the benzoic acid is 2,3-dihydroxybenzoic acid.

46. The composition according to claim 44 wherein the metal oxide is MgO and the benzoic acid is 1,5-dihydroxybenzoic acid.

47. A method for controlling the size of ceramic particles produced by precipitation, comprising the steps of:

forming a solution of a water-soluble ceramic material precursor;

adding a precipitating agent to the solution to precipitate ceramic particles; and adding to the solution, either simultaneously with the addition of the precipitating agent or immediately thereafter, from about 0.1 weight percent to about 5.0 weight percent, based on the dry weight of the ceramic, of an organic compound selected from the group consisting of hydroxylated benzoic acids, the organic compound adsorbing on the ceramic to prevent the ceramic particles from agglomerating for a period of greater than about a day.

48. The method according to claim 47 wherein the compound has a plurality of hydroxyl groups.

49. The method according to claim 47 wherein the ceramic particles are perovskites.

50. The method according to claim 47 wherein from about 0.1 weight percent to about 1.0 weight percent, based on the dry weight of the ceramic, of the organic compound is added to the solution.

* * * * *

UNITED STATES PATENT AND TRADEMARK OFFICE
CERTIFICATE OF CORRECTION

PATENT NO. : 5,624,604

DATED : April 29, 1997

INVENTOR(S) : Yasrebi et al.

It is certified that error appears in the above-identified patent and that said Letters Patent is hereby corrected as shown below:

Column 2, line 35, insert after "the" --ceramic--;
Column 6, line 8, replace alumina with --alumina--;
Column 6, line 22, replace "XI." With --IX--;
Column 6, line 41, replace "disperse" with --disperse--;
Column 13, line 55, replace "20.hours" with --20 hours--;
Column 15, line 46, replace "acid The" with --acid. The--;
Column 16, line 13, replace "percent. 2,3-dihidroxybenzoic" with --percent 2,3-dihydroxybenzoic--;
Column 18, line 1, replace "suspensions; were" with --suspensions were--;
Column 18, line 40, insert after "colloidal" --particles--;
Column 19, line 44, replace "organic: compound" with --organic compound--;
Column 22, line 63, replace "0.5" with --0.52--;
Column 23, line 45, insert after "non-polymeric" --organic--.

In the Claims:

Claim 26, column 26, line 67, replace "$R_2$" with --$R_3$--;

Claim 32, column 27, line 34, replace "$R_{1-R5}$" with --$R_1$-$R_5$--;

Claim 39, column 27, line 59, insert after "acid" --that adsorbs on the ceramic, the non-polymeric carboxylic acid --.

Signed and Sealed this

Nineteenth Day of December, 2000

Attest:

Q. TODD DICKINSON

Attesting Officer             Commissioner of Patents and Trademarks